(12) United States Patent
Isa et al.

(10) Patent No.: US 12,094,368 B2
(45) Date of Patent: Sep. 17, 2024

(54) INFORMATION PROCESSING DEVICE, DISPLAY DEVICE, AND ELECTRONIC DEVICE

(71) Applicant: SEMICONDUCTOR ENERGY LABORATORY CO., LTD., Atsugi (JP)

(72) Inventors: Toshiyuki Isa, Kanagawa (JP); Akio Endo, Kanagawa (JP); Yosuke Tsukamoto, Kanagawa (JP); Jun Koyama, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 17/346,348

(22) Filed: Jun. 14, 2021

(65) Prior Publication Data

US 2021/0304643 A1    Sep. 30, 2021

Related U.S. Application Data

(63) Continuation of application No. 16/340,227, filed as application No. PCT/IB2017/056459 on Oct. 18, 2017, now Pat. No. 11,113,995.

(30) Foreign Application Priority Data

Oct. 27, 2016 (JP) .................. 2016-210222

(51) Int. Cl.
*G06F 1/16* (2006.01)
*G09F 9/30* (2006.01)
(52) U.S. Cl.
CPC ............ *G09F 9/301* (2013.01); *G06F 1/1626* (2013.01); *G06F 1/1643* (2013.01); *G06F 1/1652* (2013.01)

(58) Field of Classification Search
CPC ...... G09F 9/301; G06F 1/1626; G06F 1/1643; G06F 1/1652; G06F 2203/04102;
(Continued)

(56) References Cited

U.S. PATENT DOCUMENTS 9,088,006 B2 * 7/2015 Yamazaki ............. H10K 59/12
9,229,481 B2   1/2016 Jinbo
(Continued)

FOREIGN PATENT DOCUMENTS

JP    2005-114759 A    4/2005
JP    2011-118082 A    6/2011
(Continued)

OTHER PUBLICATIONS

Translation of JP-2018081186-A (Year: 2018).*
(Continued)

*Primary Examiner* — Abhishek M Rathod
(74) *Attorney, Agent, or Firm* — Fish & Richardson P.C.

(57) ABSTRACT

An electronic device including a large display region and with improved portability is provided. An electronic device with improved reliability is provided.
An information processing device includes a first film, a panel substrate, and at least a first housing. The panel substrate has flexibility and a display region, and the first film has a visible-light-transmitting property and flexibility. The first housing includes a first slit, the panel substrate includes a region positioned between the first film and a second film, the first slit has a function of storing the region, and one or both of the panel substrate and the first film can slide along the first slit.

9 Claims, 13 Drawing Sheets

(58) Field of Classification Search
CPC ......... G06F 2203/04103; G06F 1/1681; G06F 3/044; G06F 3/0448; G06F 1/1683; G06F 3/041; H05B 33/02
See application file for complete search history.

(56) References Cited

U.S. PATENT DOCUMENTS

| | | | |
|---|---|---|---|
| 9,377,817 | B2 | 6/2016 | Eguchi |
| 9,582,043 | B2* | 2/2017 | Hirakata ............ G02F 1/133308 |
| 9,588,549 | B2* | 3/2017 | Endo ................. G02F 1/133305 |
| 9,627,648 | B2 | 4/2017 | Yamazaki et al. |
| 9,857,844 | B2* | 1/2018 | Tsukamoto ........... G06F 1/1626 |
| 9,947,882 | B2* | 4/2018 | Zhang ................. H10K 50/858 |
| 9,952,626 | B2 | 4/2018 | Jinbo |
| 9,958,976 | B2 | 5/2018 | Endo et al. |
| 10,003,047 | B2 | 6/2018 | Yamazaki et al. |
| 10,139,660 | B2 | 11/2018 | Hirakata |
| 10,170,524 | B2 | 1/2019 | Eguchi |
| 10,254,796 | B2* | 4/2019 | Isa ........................ G06F 1/1641 |
| 10,338,716 | B2 | 7/2019 | Endo et al. |
| 10,579,105 | B2* | 3/2020 | Jones ................. G06F 1/1641 |
| 2005/0221095 | A1* | 10/2005 | Miyazaki ................. C09D 4/00 428/423.1 |
| 2015/0016126 | A1* | 1/2015 | Hirakata ............... F21V 15/012 362/418 |
| 2015/0023030 | A1* | 1/2015 | Tsukamoto ........... G06F 1/1652 362/419 |
| 2015/0055286 | A1 | 2/2015 | Eguchi |
| 2015/0062525 | A1* | 3/2015 | Hirakata ........... G02F 1/133308 349/158 |
| 2015/0177789 | A1 | 6/2015 | Jinbo |
| 2015/0261259 | A1* | 9/2015 | Endo ..................... H10K 59/12 361/679.06 |
| 2017/0315589 | A1* | 11/2017 | Isa ........................ G06F 1/1675 |
| 2018/0294437 | A1 | 10/2018 | Yamazaki et al. |
| 2018/0370207 | A1* | 12/2018 | Nodono ................. B32B 27/06 |
| 2019/0014677 | A1* | 1/2019 | Chida ..................... H05K 7/14 |
| 2019/0163007 | A1 | 5/2019 | Hirakata |
| 2019/0189035 | A1* | 6/2019 | Ochi ..................... H10K 59/10 |
| 2022/0267637 | A1* | 8/2022 | van Peer .............. C09D 175/16 |

FOREIGN PATENT DOCUMENTS

| | | | | |
|---|---|---|---|---|
| JP | 2013-050547 | A | | 3/2013 |
| JP | 2014-197522 | A | | 10/2014 |
| JP | 2015-062059 | A | | 4/2015 |
| JP | 2015-064570 | A | | 4/2015 |
| JP | 2015-135484 | A | | 7/2015 |
| JP | 2016075884 | A | * 5/2016 | ............ G01S 19/13 |
| JP | 2018081186 | A | * 5/2018 | |
| KR | 2015-0021467 | A | | 3/2015 |

OTHER PUBLICATIONS

Translation of JP-2016075884-A (Year: 2016).*
International Search Report (Application No. PCT/IB2017/056459) Dated Dec. 26, 2017.
Written Opinion (Application No. PCT/IB2017/056459) Dated Dec. 26, 2017.

* cited by examiner

500B though. US 12,094,368 B2

INFORMATION PROCESSING DEVICE, DISPLAY DEVICE, AND ELECTRONIC DEVICE

CROSS REFERENCE TO RELATED APPLICATIONS

This application is a continuation of U.S. application Ser. No. 16/340,227, filed Apr. 8, 2019, now allowed, which is incorporated by reference and is a U.S. National Phase Application under 35 U.S.C. § 371 of International Application PCT/IB2017/056459, filed on Oct. 18, 2017, which is incorporated by reference and claims the benefit of a foreign priority application filed in Japan as Application No. 2016-210222 on Oct. 27, 2016.

TECHNICAL FIELD

One embodiment of the present invention relates to an information processing device, a display device, and an electronic device.

Note that one embodiment of the present invention is not limited to the above technical field. The technical field of one embodiment of the invention disclosed in this specification and the like relates to an object, a method, or a manufacturing method. Alternatively, one embodiment of the present invention relates to a process, a machine, manufacture, or a composition of matter. Thus, more specifically, examples of the technical field of one embodiment of the present invention disclosed in this specification include a semiconductor device, a display device, a light-emitting device, a power storage device, a memory device, a driving method thereof, and a manufacturing method thereof.

BACKGROUND ART

Electronic devices including display devices have recently been diversified. One of them is an information processing device such as a cellular phone, a smartphone, a tablet terminal, and a wearable terminal.

Examples of the display devices include, typically, a light-emitting device including a light-emitting element such as an organic EL (Electro Luminescence) element or a light-emitting diode (LED), a liquid crystal display device, and electronic paper performing display by an electrophoretic method or the like. Patent Document 1 and Patent Document 2 each disclose a flexible light-emitting device using an organic EL element.

REFERENCES

Patent Documents

[Patent Document 1] Japanese Published Patent Application No. 2014-197522
[Patent Document 2] Japanese Published Patent Application No. 2015-064570

SUMMARY OF INVENTION

Problems to be Solved by the Invention

In recent years, information processing devices, display devices, and electronic devices having large display regions have been particularly required. A large display region offers advantages such as improved browsability and increased amount of information that can be displayed. However, in portable electronic devices, an enlargement of display regions causes a reduction in portability. For this reason, browsability of display and portability are difficult to improve at the same time.

An object of one embodiment of the present invention is to provide an electronic device with a large display region. Another object is to improve the portability of an electronic device. Another object is to achieve both an improvement in browsability of display and an improvement in portability. Another object is to provide a novel electronic device. Another object is to improve the reliability of an electronic device.

Note that the description of these objects does not preclude the existence of other objects. Note that one embodiment of the present invention does not necessarily achieve all the objects. Note that objects other than the above will be apparent from the description of the specification, the drawings, the claims, and the like and objects other than the above can be derived from the description of the specification, the drawings, the claims, and the like.

Means for Solving the Problems

An information processing device of one embodiment of the present invention includes a hinge, a first housing, a second housing, a panel substrate, and a first film. The hinge includes a rotation axis, the first housing is connected to the second housing through the hinge so as to be rotatable around the rotation axis, the first housing includes a first slit, and the second housing includes a second slit. The panel substrate includes a region overlapping with the first film, the region is stored in any one or both of the first slit and the second slit, and any one or both of the panel substrate and the first film can slide along the second slit.

Furthermore, an information processing device of one embodiment of the present invention is the above-described information processing device including a second film. The panel substrate includes a region positioned between the first film and the second film.

Furthermore, an information processing device of one embodiment of the present invention is the above-described information processing device in which the first film has flexibility and a visible-light-transmitting property. The panel substrate has flexibility and a display region. The first housing includes a first part and a second part, the first part overlaps with the display region, and the second part overlaps with a peripheral portion of the first part. Furthermore, the second film is positioned between the display region and the first part, and the second film has flexibility.

Furthermore, in the information processing device of one embodiment of the present invention, the first film is fixed to part of the first housing. The first film, the second film, and the panel substrate can slide along the second slit when the second housing rotates around the rotation axis with respect to the first housing.

Furthermore, in the information processing device of one embodiment of the present invention, the first film is fixed to the first housing, the first film can slide along the second slit in the second housing when the second housing rotates around the rotation axis with respect to the first housing, and the second film is fixed to the first housing and the second housing.

Furthermore, in the information processing device of one embodiment of the present invention, the second housing includes an end portion that is parallel to the rotation axis, the first film and the panel substrate slide in the second slit, the first film is apart from the end portion, and the panel substrate is apart from the end portion.

Furthermore, in the information processing device of one embodiment of the present invention, the second housing rotates around the rotation axis with respect to the first housing, whereby the first film has a planar shape or a convex shape on the panel substrate.

Furthermore, the information processing device of one embodiment of the present invention includes a circuit board. The circuit board is electrically connected to the panel substrate, and the circuit board is stored in the first housing.

Furthermore, the information processing device of one embodiment of the present invention includes at least one driver circuit. The driver circuit is provided over the panel substrate, and the panel substrate includes a curved portion between the driver circuit and the display region.

Furthermore, in the information processing device of one embodiment of the present invention, the panel substrate includes a curved portion between an image signal line driver circuit and the display region.

Furthermore, the information processing device of one embodiment of the present invention includes an input portion. The input portion includes a touch sensor, and the touch sensor includes a region overlapping with the display region.

Furthermore, the information processing device of one embodiment of the present invention includes a first flexible printed board and a second flexible printed board. The first flexible printed board and the second flexible printed board are stored in the first housing. In the information processing device, the first flexible printed board supplies a control signal to the display region, and the second flexible printed board supplies a control signal to the touch sensor.

Furthermore, the information processing device of one embodiment of the present invention includes one or more of a keyboard, a hardware button, a pointing device, an illuminance sensor, an imaging device, an audio input device, an eye-gaze input device, and a pose detection device.

Effect of the Invention

According to one embodiment of the present invention, a novel information processing device with excellent portability and reliability can be provided. Alternatively, a novel information processing device with excellent operability can be provided. Alternatively, a novel information processing device, a novel display device, or the like can be provided. Note that the description of these effects does not preclude the existence of other effects. Note that one embodiment of the present invention does not necessarily achieve all the effects. Note that effects other than the above will be apparent from the description of the specification, the drawings, the claims, and the like and effects other than the above can be derived from the description of the specification, the drawings, the claims, and the like.

MODE FOR CARRYING OUT THE INVENTION

Figure 1A:
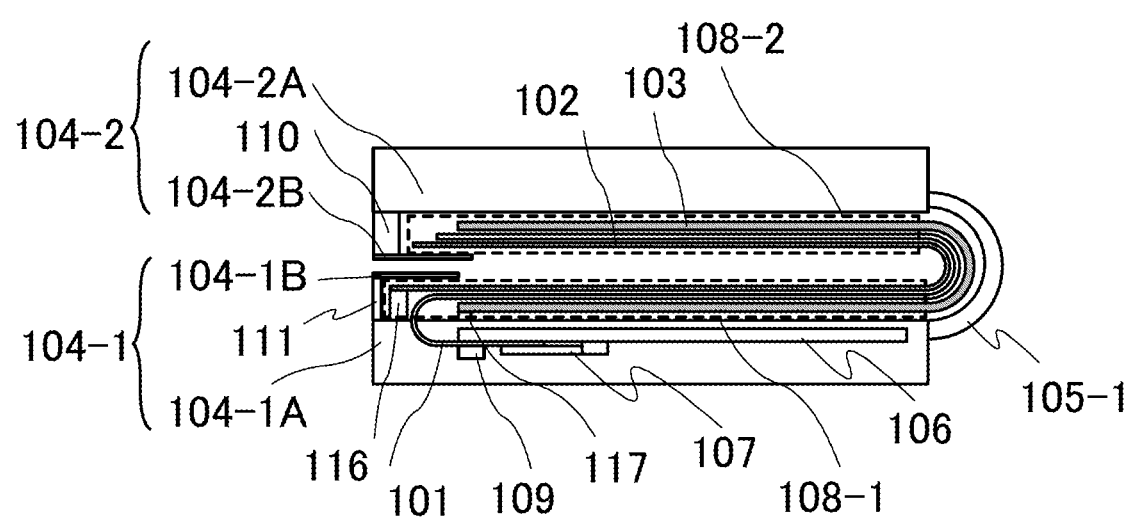
FIGS. 1A and 1B show cross sections of an information processing device of an embodiment.

Embodiments will be described in detail with reference to the drawings. Note that the present invention is not limited to the following description, and it is easily understood by those skilled in the art that modes and details can be modified in various ways without departing from the spirit and scope of the present invention. Accordingly, the present invention should not be interpreted as being limited to the description of the embodiments below. Note that in the structures of the invention described below; the same portions or portions having similar functions are denoted by the same reference numerals in different drawings, and the description thereof is not repeated.

Embodiment 1

In this embodiment, a foldable touch panel that is an information processing device of one embodiment of the present invention will be described with reference to FIG. 1 to FIG. 4. The touch panel includes a display portion and a touch sensor.

<Description of Cross-Sectional View>

Figure 1B:
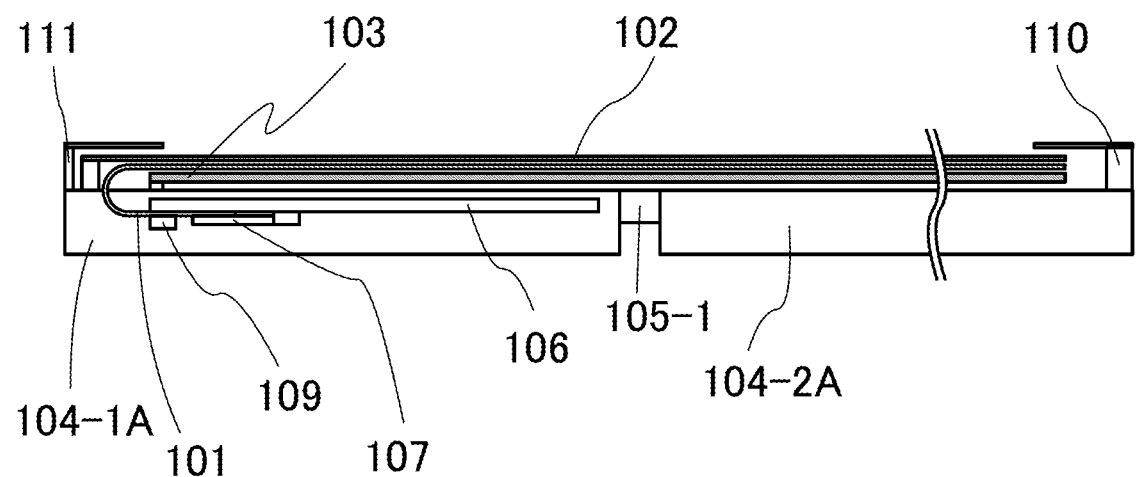

FIG. 1(A) shows a cross-sectional view of one state of a foldable touch panel of one embodiment of the present invention. FIG. 1(B) is a drawing showing another state of the foldable touch panel of one embodiment of the present invention.

In one embodiment of the present invention, the foldable touch panel includes a panel substrate 101, a first film 102, a second film 103, a first housing 104-1, a second housing 104-2, a hinge 105-1, a circuit board 106, and a flexible substrate FPC 107. The panel substrate 101, the first film 102, and the second film 103 each have flexibility. The first housing 104-1 can rotate around a rotation axis of the hinge 105-1 with respect to the second housing 104-2. It can be said that the state shown in FIG. 1(A) is the state where the information processing device is folded around the rotation axis of the hinge 105-1.

In FIG. 1(A), the first housing 104-1 includes a first part 104-1A, a second part 104-1B, and an end portion 111. The second housing 104-2 includes a first part 104-2A, a second part 104-2B, and an end portion 110. The first part 104-1A and the first part 104-2A are connected to the hinge 105-1, and the circuit board 106 and the FPC 107 are stored in the first part 104-1A. The second part 104-1B included in the first housing 104-1 overlaps with a peripheral portion of the first part 104-1A. A space is formed between the second part 104-1B and the peripheral portion of the first part 104-1A. The second part 104-2B included in the second housing 104-2 overlaps with a peripheral portion of the first part 104-2A. Another space is formed between the second part 104-2B and the peripheral portion of the first part 104-2A. The end portion 111 is positioned between the first part 104-1A and the second part 104-1B. The end portion 110 is positioned between the first part 104-2A and the second part 104-2B. For example, in the first housing 104-1, a space (a slit 108-1) is formed in a region surrounded by the first part 104-1A, the second part 104-1B, and the end portion 111. In the second housing 104-2, a space (a slit 108-2) is formed in a region surrounded by the first part 104-2A, the second part 104-2B, and the end portion 110. In other words, the slit 108-1 is provided in the first housing 104-1, and the slit 108-2 is provided in the second housing 104-2.

The first film 102, the panel substrate 101, and the second film 103 overlap with each other and are stored in the slit 108-1 and the slit 108-2.

In the case where a driver circuit is provided on the panel substrate, it may be provided as an in-cell circuit or provided by a COG (Chip On Glass) method or a COF (Chip On Film) method. FIG. 1(A) and FIG. 1(B) show a socket 109 that is provided with the use of a COG method.

The information processing device of one embodiment of the present invention includes the foldable panel substrate 101 and the first film 102, which is transparent and has a thickness of 50 µm to 500 µm, preferably 80 µm to 150 µm. The first film 102 prevents mechanical damage on the surface of the panel substrate 101 and prevents the panel substrate 101 from being lifted up from the first housing 104-1 and the second housing 104-2. In addition, the second film 103 can be stored between the panel substrate 101 and the first housing 104-1 or the second housing 104-2. The panel substrate 101 is interposed between the first film 102 and the second film 103 so as to be able to slide. Thus, the panel substrate 101 can be supported by the first housing 104-1 and the second housing 104-2. The second film 103 can reduce the amount of deformation of the panel substrate 101 due to pressing with touch panel operation. Note that the information processing device of one embodiment of the present invention can have a structure in which mechanical damage on the surface is prevented even with a structure without the second film 103.

In one embodiment of the present invention, the first film 102 and the second film 103 are each fixed to a portion in contact with the first housing 104-1, thereby supported by the first housing 104-1. As shown in FIG. 1(A), the first film 102 is fixed to the first housing 104-1 with a support portion 116. The second film 103 is fixed to the first housing 104-1 with a support portion 117.

In one embodiment of the present invention, the panel substrate 101 is connected to the circuit board 106 through the FPC 107. The circuit board 106 is fixed to the first housing 104-1. The panel substrate 101 is supported by the first housing 104-1 with the use of friction generated between a folded portion of the panel substrate 101 and the first housing 104-1 in the vicinity of the end portion 111 and connection between the FPC 107 and the circuit board 106.

In the slit 108-1 included in the first housing 104-1, the first film 102 and the panel substrate 101 may be fixed to each other, and the panel substrate 101 and the second film 103 may be fixed to each other. Thus, the panel substrate 101, the first film 102, and the second film 103 can slide on each other in the slit 108-2 included in the second housing 104-2. Alternatively, stress applied to the panel substrate with the folding operation of the information processing device can be relieved. Alternatively, damage on the panel substrate due to the stress can be prevented.

The first film 102 includes a region that is not fixed to the panel substrate 101. When the information processing device is folded while the first film 102 and the panel substrate 101 are fixed to each other, the panel substrate 101 is prone to fracture due to stress. In one embodiment of the present invention, the first film 102 and the panel substrate 101 slide when the folding operation of the above information processing device is performed, whereby damage on the panel substrate 101 due to stress is reduced.

Figure 2A:
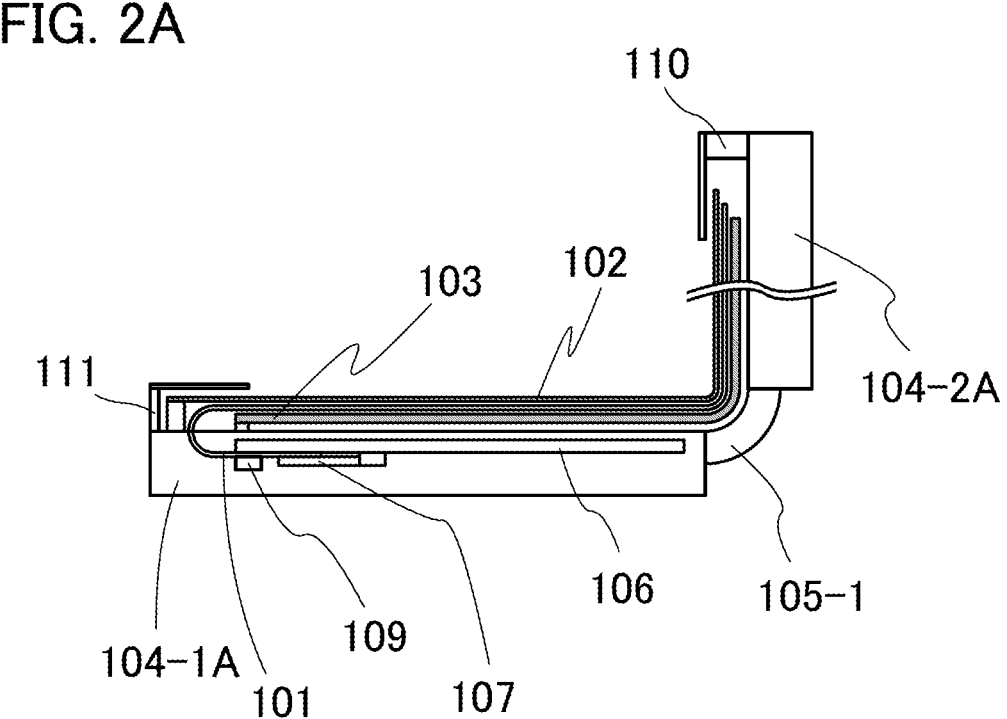
FIGS. 2A and 2B show cross sections of an information processing device of an embodiment.
Figure 2B:
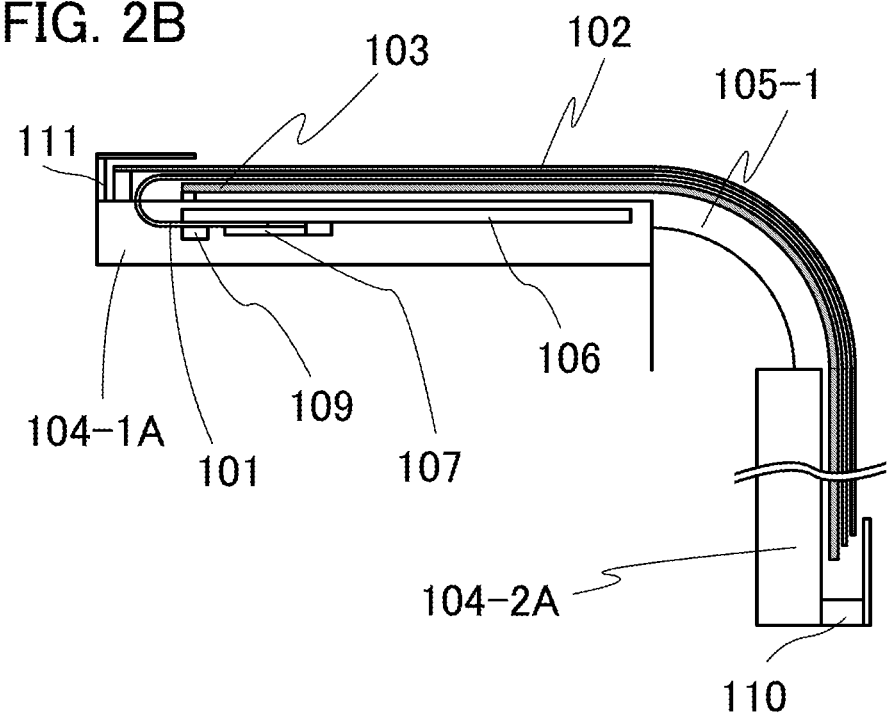

In the information processing device of one embodiment of the present invention, the display portion is visible through the first film 102. That is, the first film 102 transmits light with a wavelength in the visible light range. FIG. 2(A) is the state where the information processing device is folded so that the display surface is concave. In this state, the first film 102 is closer to the end portion 110 than the second film 103 is. FIG. 2(B) is the state where the information processing device is folded so that the display surface is convex. In this state, the second film 103 is closer to the end portion 110 than the first film 102 is. The first film 102, the second film 103, and the panel substrate 101 slide on each other in this manner: it is thus possible to reduce bending stress, compressive stress, and tensile stress that are applied to the panel substrate 101.

<Description of Top View of Panel Substrate>

Figure 3A:
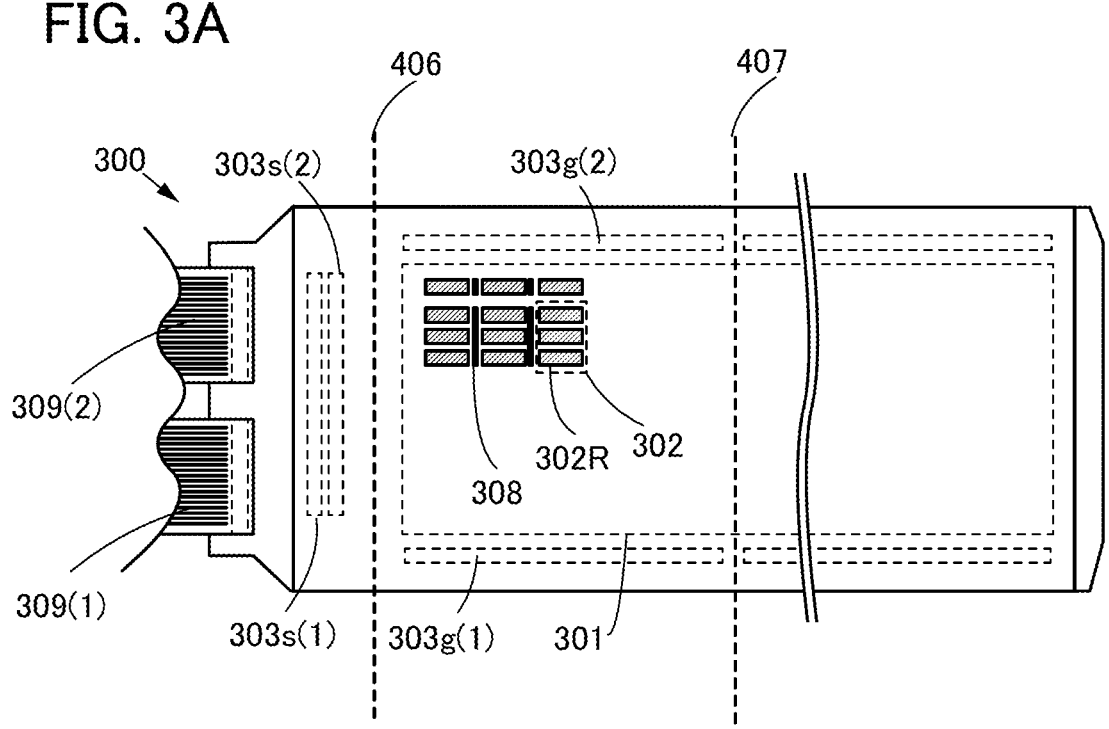
FIGS. 3A and 3B show structures of touch panels that can be used in an information processing device of an embodiment.
Figure 3B:
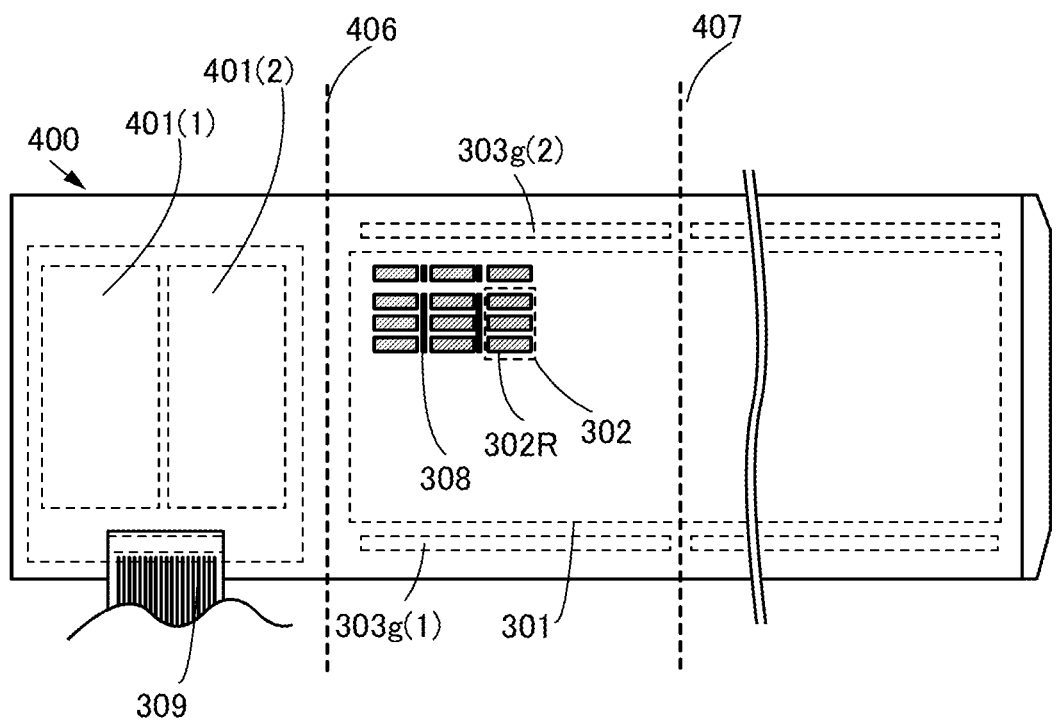

In this embodiment, a touch panel 300 can be used as the panel substrate 101, for example (see FIG. 3(A)). Alternatively, a touch panel 400 can be used (see FIG. 3(B)). The touch panel 300 and the touch panel 400 each include a display portion 301.

The touch panel 300 or the touch panel 400 includes a touch sensor, and the touch sensor includes a region overlapping with the display portion 301. For example, a sheet-like capacitive touch sensor that overlaps with a display panel can be used. Alternatively, what is called an in-cell touch panel can be used. The in-cell touch panel has a touch sensor function. For example, a capacitive touch sensor may be used, or an optical touch sensor using a photoelectric conversion element may be used. Specifically, a photoelectric conversion element can be used for an optical touch sensor (see FIG. 3(A) or FIG. 3(B)). For example, the optical touch sensor includes the display portion 301, and the display portion 301 includes a plurality of pixels 302 and a plurality of imaging pixels 308. The imaging pixels 308 can sense a finger touching the display portion 301, a finger held over the display portion 301, or the like.

Each of the pixels 302 includes a plurality of sub-pixels (e.g., a sub-pixel 302R), and the sub-pixels include light-emitting elements and pixel circuits.

The pixel circuits are electrically connected to wirings that can supply selection signals and wirings that can supply image signals, and the pixel circuits supply power for driving the light-emitting elements.

The touch panel 300 shown in FIG. 3(A) includes a scan line driver circuit 303$g$(1) and an image signal line driver circuit 303$s$(1). The scan line driver circuit 303$g$(1) can supply selection signals to the pixels 302. The image signal line driver circuit 303$s$(1) can supply image signals to the pixels 302, and the touch panel 400 shown in FIG. 3(B) includes a scan line driver circuit and an image signal line driver circuit. The scan line driver circuit can supply selection signals to the pixels 302. The image signal line driver circuit can supply image signals to the pixels 302. In the case of provision, the touch panel 400 includes a region 401(1) and a region 401(2) in each of which the socket 109 is placed, and the driver circuits are provided in the regions by a COG method.

The imaging pixels 308 include photoelectric conversion elements and imaging pixel circuits, and the imaging pixel circuits drive the photoelectric conversion elements.

The imaging pixel circuits are electrically connected to wirings that can supply control signals and wirings that can supply power supply potentials.

For example, a signal for selecting a predetermined imaging pixel circuit to read out a recorded imaging signal, a signal for initializing an imaging pixel circuit, and a signal for determining time for an imaging pixel circuit to sense light can be used as the control signals.

The touch panel 300 or the touch panel 400 includes an imaging pixel driver circuit 303$g$(2) and an imaging signal line driver circuit 303$s$(2). The imaging pixel driver circuit 303$g$(2) can supply control signals to the imaging pixels 308. The imaging signal line driver circuit 303$s$(2) can read out imaging signals.

The touch panel 300 or the touch panel 400 can be folded at a region indicated by a line segment 406 or a line segment 407. For example, a region indicated by the line segment 406 is placed in the vicinity of the end portion 111 and a region indicated by the line segment 407 is placed in the vicinity of the hinge 105-1, so that the touch panel 300 or the touch panel 400 can be folded.

The touch panel 300 can be folded at the region indicated by the line segment 406. For example, the touch panel 300 can be folded at a portion between a region where the scan line driver circuit 303$g$(1) and the image signal line driver circuit 303$s$(1) are placed and a region where the display portion is placed. The touch panel 400 can be folded at a portion between a region where the region 401(1) and the region 401(2) are placed and a region where the display portion is placed. Accordingly, the area of the second part 104-1B can be reduced. Alternatively, the area of the region where the scan line driver circuit 303$g$(1) and the image signal line driver circuit 303$s$(1) are placed in the touch panel 300 can be larger than the area of the second part 104-1B. Alternatively, the area of the region where the region 401(1) and the region 401(2) are placed in the touch panel 400 can be larger than the area of the second part 104-1B.

<Description of Top View of Housing>

Figure 4:
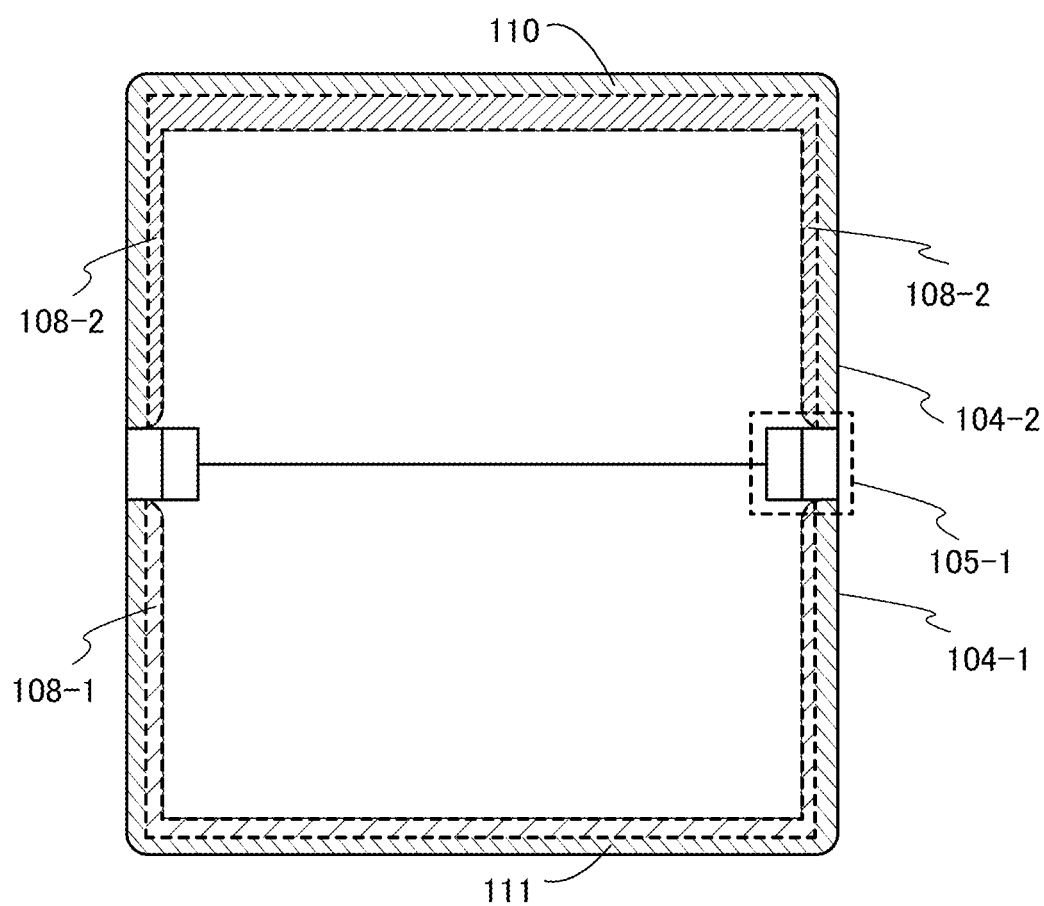
FIG. 4 shows a housing of an information processing device of an embodiment.

FIG. 4 shows the first housing 104-1, the second housing 104-2, the hinge 105-1, the slit 108-1, the slit 108-2, and the end portion 110.

The hinge 105-1 is connected to one side of the second housing 104-2, and the slit 108-2 is provided on other three sides of the second housing 104-2. The end portion 110 is provided parallel to the rotation axis of the hinge 105-1. The hinge 105-1 is connected to one side of the first housing 104-1, and the slit 108-1 is provided on other three sides of the first housing 104-1. The end portion 111 is provided parallel to the rotation axis of the hinge 105-1.

The panel substrate 101, the first film 102, and the second film 103 are fixed to the first housing 104-1. Accordingly, the distance between the end portion 111 and the panel substrate 101, the distance between the end portion 111 and the first film 102, and the distance between the end portion 111 and the second film 103 do not change even when the information processing device is folded at the hinge 105-1. By contrast, the panel substrate 101, the first film 102, and the second film 103 are not fixed to the second housing 104-2. Accordingly, when the information processing device is folded at the hinge 105-1, the distance between the end portion 110 and the panel substrate 101, the distance between the end portion 110 and the first film 102, and the distance between the end portion 110 and the second film 103 change. For example, as the distance between the rotation axis of the hinge 105-1 and the panel substrate 101 becomes longer, the distance between the end portion 110 and the panel substrate 101 changes more largely.

Note that in the case where high bending stress, compressive stress, and tensile stress are not applied to the second film 103 when the information processing device is folded at the hinge 105-1, the second film 103 may be fixed to the first housing 104-1 and the second housing 104-2.

FIG. 1(A), FIG. 1(B), and FIG. 4 simply show the hinge 105-1. In the state shown in FIG. 1(B), the rotation axis of the hinge 105-1 overlaps with the panel substrate 101. With this configuration, the sliding distance of the panel substrate 101, the sliding distance of the first film 102, and the sliding distance of the second film 103 with the folding operation of the information processing device can be reduced.

The panel substrate 101 is apart from the end portion 110, the first film 102 is apart from the end portion 110, and the second film 103 is apart from the end portion 110. Thus, even when the panel substrate 101, the first film 102, and the second film 103 slide with the folding operation of the information processing device, neither the panel substrate 101, the first film 102, nor the second film 103 comes in contact with the end portion 110. The end portion of the first film 102 always overlaps with the second part 104-2B. Accordingly, the end portions of the panel substrate 101, the first film 102, and the second film 103 can be prevented from being detached from the slit 108-2 or colliding with the end portion of the second part 104-2B. Alternatively, neither the panel substrate 101, the first film 102, nor the second film 103 comes in contact with the end portion 110. Alternatively, it is possible to prevent warping, degradation, and fracture of the panel substrate 101, the first film 102, and the second film 103 due to a contact with the end portion 110.

For example, the display portion can be provided over the panel substrate 101, and the touch panel can be provided over the first film 102. Note that the first film 102 and the panel substrate 101 slide: thus, the position of the touch panel relative to the display portion is shifted with the slide in some cases. When positional information is input to the touch panel with the position shifted, unintended information is input in some cases. For example, the touch panel and the display portion can be provided over the panel substrate 101. Thus, the positional shift of the touch panel relative to the display portion can be eliminated, which is preferable.

The information processing device of one embodiment of the present invention may be constituted only by the first film 102 and the panel substrate 101. In that case, the panel substrate 101 is in contact with the first film 102 so as to be able to slide, and supported by the first housing 104-1 and the second housing 104-2.

The information processing device of one embodiment of the present invention may be constituted only by three or more films and the panel substrate 101. In that case, the panel substrate 101 is in contact with a film that is in contact with one surface thereof and a film that is in contact with the opposite surface thereof so as to be able to slide on each other, and supported by the first housing 104-1 and the second housing 104-2.

The information processing device of one embodiment of the present invention may have a structure in which a plurality of hinges are provided and three or more housings are included. When one of the connected housings of the information processing device is referred to as a first housing, a structure may be employed in which the first film 102 and the panel substrate 101 can slide in a slit of a housing other than the first housing.

Embodiment 2

In this embodiment, a structure of a foldable touch panel included in an information processing device of one embodiment of the present invention will be described with reference to FIG. 5.

Figure 5A:
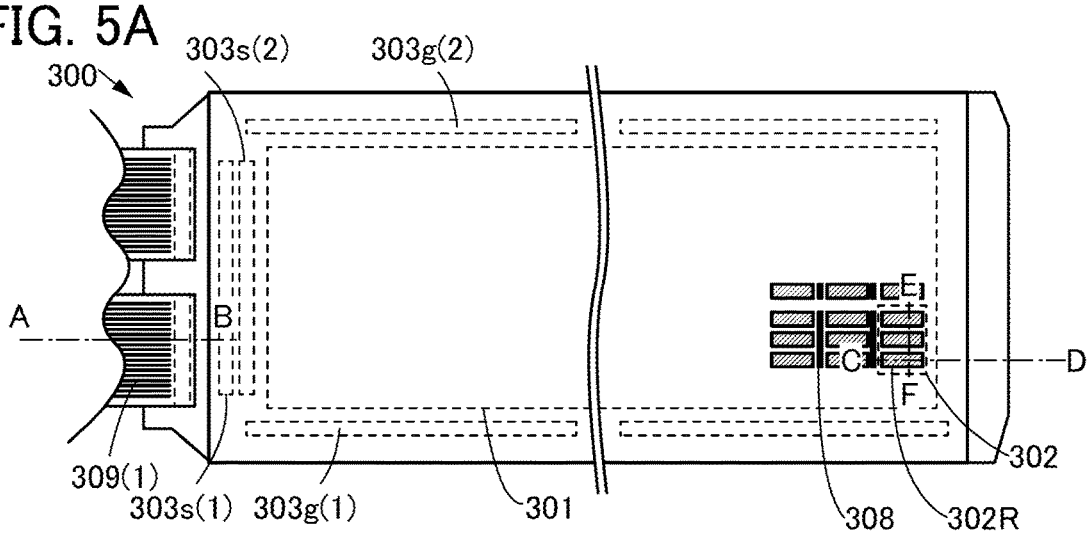
FIGS. 5A-5C show structures of a touch panel that can be used in an information processing device of an embodiment.

FIG. 5(A) is a top view illustrating a structure of the touch panel that can be used in the information processing device of one embodiment of the present invention. The components in FIG. 5(A) correspond to those in FIG. 3(A).

Figure 5B:
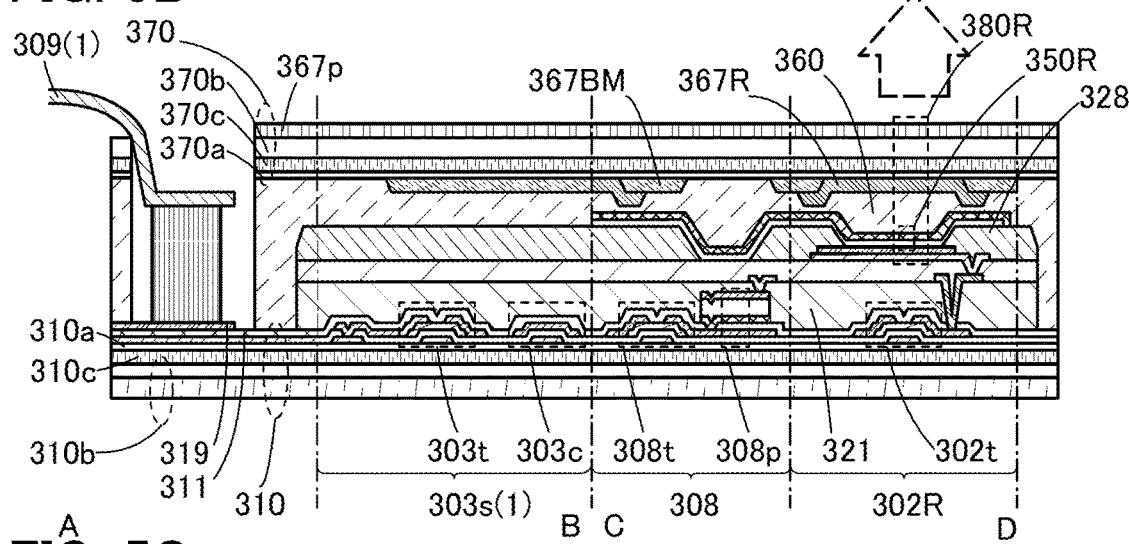

FIG. 5(B) is a cross-sectional view along the section line A-B and the section line C-D in FIG. 5(A).

Figure 5C:
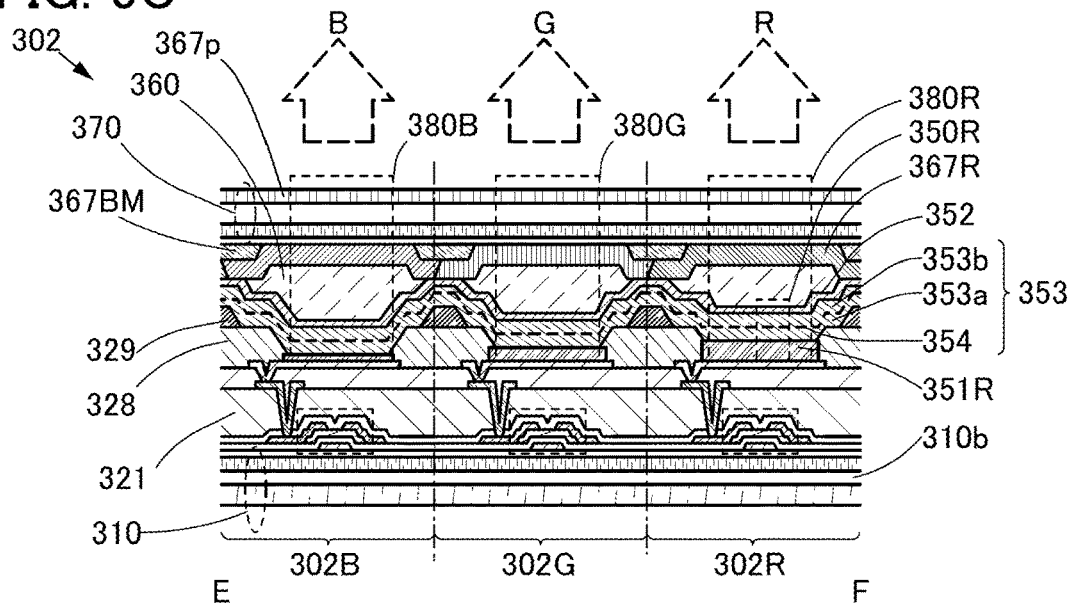

FIG. 5(C) is a cross-sectional view along the section line E-F in FIG. 5(A).

<Description of Cross-Sectional View>

The touch panel 300 includes a substrate 310 and a counter substrate 370 that faces the substrate 310 (see FIG. 5(B)).

The use of a flexible material for the substrate 310 and the counter substrate 370 can give the touch panel 300 flexibility.

Note that when the flexible touch panel 300 is changed in its form, stress is applied to a functional element provided in the touch panel 300. Preferably, the functional element is placed substantially at the midpoint between the substrate 310 and the counter substrate 370, in which case a change in the form of the functional element can be inhibited.

Furthermore, materials with a small difference in coefficient of linear expansion are preferably used for the substrate 310 and the counter substrate 370. The coefficient of linear expansion of the materials is preferably lower than or equal to $1 \times 10^{-3}$/K, further preferably lower than or equal to $5 \times 10^{-5}$/K, and still further preferably lower than or equal to $1 \times 10^{-5}$/K.

For example, materials that contain polyester, polyolefin, polyamide (nylon, aramid, or the like), polyimide, polycarbonate, polyurethane, an acrylic resin, an epoxy resin, or a resin having a siloxane bond, such as silicone, can be used for the substrate 310 and the counter substrate 370.

The substrate 310 is a stacked body in which a flexible substrate 310b, a barrier film 310a that prevents diffusion of impurities into light-emitting elements, and a resin layer 310c that bonds the substrate 310b and the barrier film 310a together are stacked.

The counter substrate 370 is a stacked body of a flexible base 370b, a barrier film 370a that prevents diffusion of impurities into the light-emitting elements, and a resin layer 370c that bonds the base 370b and the barrier film 370a together (see FIG. 5(B)).

A sealant 360 bonds the counter substrate 370 and the substrate 310 together. The sealant 360 has a higher refractive index than the air and also serves as a layer having an optical adhesive function. The pixel circuits and the light-emitting elements (e.g., a first light-emitting element 350R) are positioned between the substrate 310 and the counter substrate 370.

<Structure of Pixel>

Each of the pixels 302 includes a sub-pixel 302R, a sub-pixel 302G, and a sub-pixel 302B (see FIG. 5(C)). The sub-pixel 302R includes a light-emitting module 380R, the sub-pixel 302G includes a light-emitting module 380G, and the sub-pixel 302B includes a light-emitting module 380B.

For example, the sub-pixel 302R includes the first light-emitting element 350R and the pixel circuit including a transistor 302t that can supply electric power to the first light-emitting element 350R (see FIG. 5(B)). The light-emitting module 380R includes the first light-emitting element 350R and an optical element (e.g., a first coloring layer 367R).

The first light-emitting element 350R includes a first lower electrode 351R, an upper electrode 352, and a layer 353 containing a light-emitting organic compound between the first lower electrode 351R and the upper electrode 352 (see FIG. 5(C)).

The layer 353 containing a light-emitting organic compound includes a light-emitting unit 353a, a light-emitting unit 353b, and an intermediate layer 354 between the light-emitting unit 353a and the light-emitting unit 353b.

The light-emitting module 380R includes the first coloring layer 367R on the counter substrate 370. The coloring layer transmits light with a particular wavelength, and a layer that selectively transmits light of red, green, blue, or the like can be used, for example. Alternatively, a region that transmits light emitted from the light-emitting element as it is may be provided.

The light-emitting module 380R, for example, includes the sealant 360 that is in contact with the first light-emitting element 350R and the first coloring layer 367R.

The first coloring layer 367R is in a position overlapping with the first light-emitting element 350R. Accordingly, part of light emitted from the first light-emitting element 350R passes through the sealant 360, which also serves as a layer having an optical adhesive function, and the first coloring layer 367R and is emitted to the outside of the light-emitting module 380R as indicated by arrows in the drawings. The information processing device of one embodiment of the present invention includes the first film 102 in the direction of the arrows.

<Structure of Display Panel>

The touch panel 300 includes a light-blocking layer 367BM on the counter substrate 370. The light-blocking layer 367BM is provided to surround the coloring layer (e.g., the first coloring layer 367R).

The touch panel 300 includes an anti-reflective layer 367p in a position overlapping with the display portion 301. As the anti-reflective layer 367p, for example, a circular polarizing plate can be used.

The touch panel 300 includes an insulating film 321. In FIG. 5(B), the insulating film 321 covers the transistor 302t. Note that the insulating film 321 can be used as a layer for reducing unevenness caused by the pixel circuits. An insulating film on which a layer that can inhibit diffusion of impurities into the transistor 302t and the like is stacked can be used as the insulating film 321.

The touch panel 300 includes the light-emitting elements (e.g., the first light-emitting element 350R) over the insulating film 321.

The touch panel 300 includes, over the insulating film 321, a partition wall 328 that overlaps with an end portion of the first lower electrode 351R (see FIG. 5(C)). The touch panel 300 further includes, over the partition wall 328, a spacer 329 that controls the distance between the substrate 310 and the counter substrate 370.

<Structure of Image Signal Line Driver Circuit>

The image signal line driver circuit 303s(1) includes a transistor 303t and a capacitor 303c. Note that the driver circuit and the pixel circuits can be formed in the same process and over the same substrate.

<Structure of Imaging Pixel>

The imaging pixels 308 each include a photoelectric conversion element 308p and an imaging pixel circuit for sensing light emitted to the photoelectric conversion element 308p. The imaging pixel circuit includes a transistor 308t.

For example, a pin photodiode can be used as the photoelectric conversion element 308p.

<Other Components>

The touch panel 300 includes a wiring 311 that can supply a signal, and the wiring 311 is provided with a terminal 319. Note that an FPC 309(1) that can supply signals such as an image signal and a synchronization signal is electrically connected to the terminal 319. The terminal 319 may be connected to the FPC 309(1) and an FPC 309(2) separately, or may be connected to one FPC 309.

Note that a printed wiring board (PWB) may be bonded to the FPC 309(1).

Transistors formed in the same process can be used as the transistors such as the transistor 302t, the transistor 303t, and the transistor 308t.

Transistors having a bottom-gate structure, a top-gate structure, or the like can be used.

A variety of semiconductors can be used in the transistors. For example, an oxide semiconductor, single crystal silicon, polysilicon, amorphous silicon, or the like can be used.

Note that this embodiment can be combined with the other embodiments in this specification as appropriate.

Embodiment 3

In this embodiment, a structure of a foldable touch panel that can be used for the panel substrate included in the information processing device of one embodiment of the present invention will be described with reference to FIG. 6 and FIG. 7.

Figure 6A:
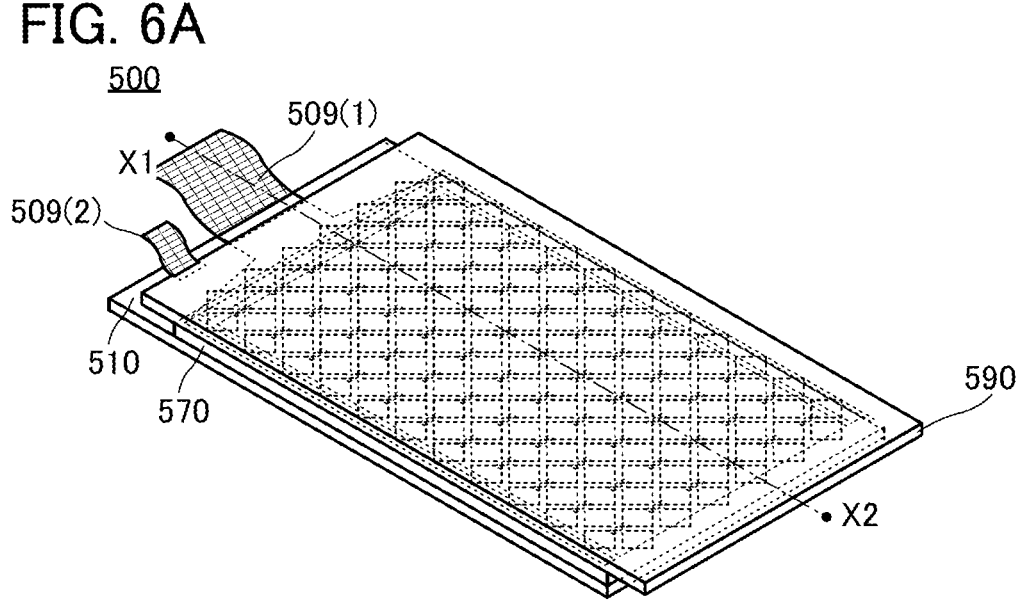
FIGS. 6A and 6B show structures of a touch panel that can be used in an information processing device of an embodiment.
Figure 6B:
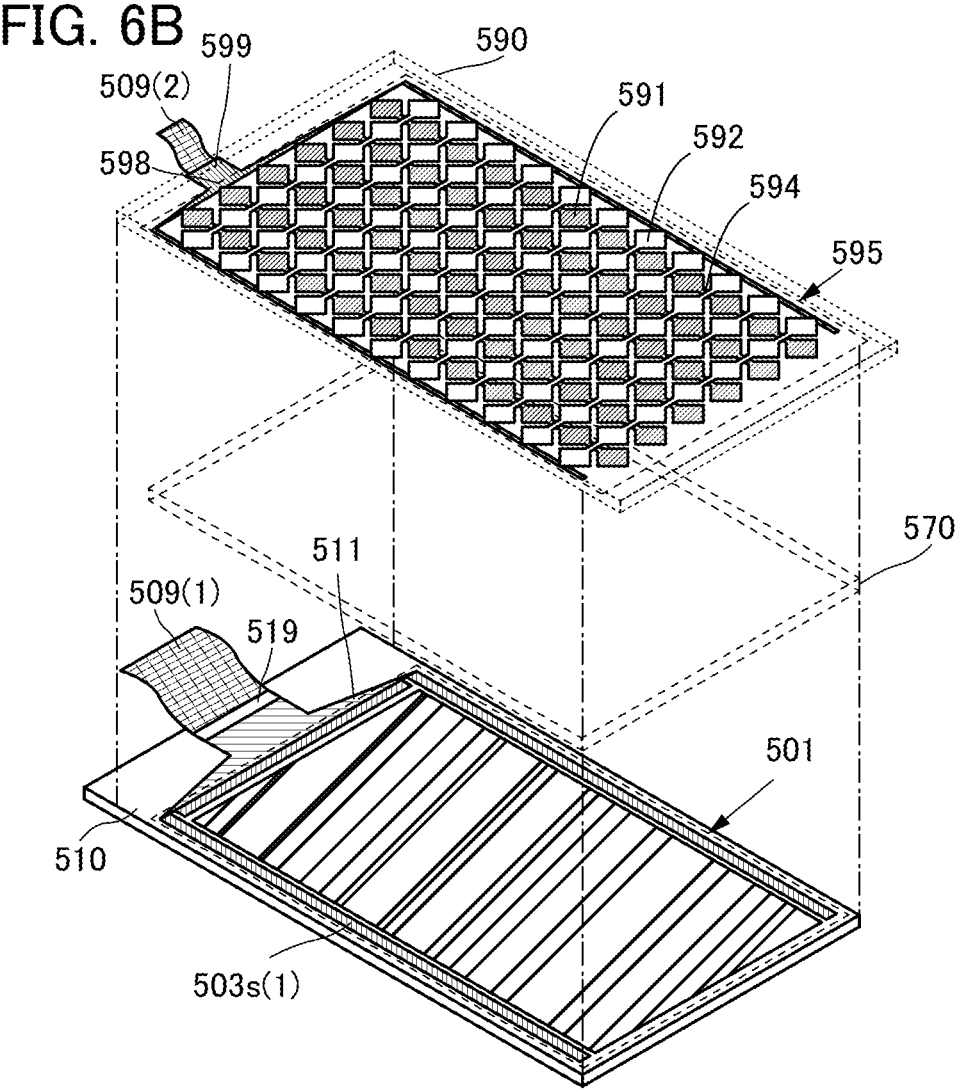

FIG. 6(A) is a perspective view of a touch panel 500 exemplified in this embodiment. Note that FIG. 6 shows main components for simplicity. FIG. 6(B) is a perspective view of the touch panel 500.

Figure 7A:
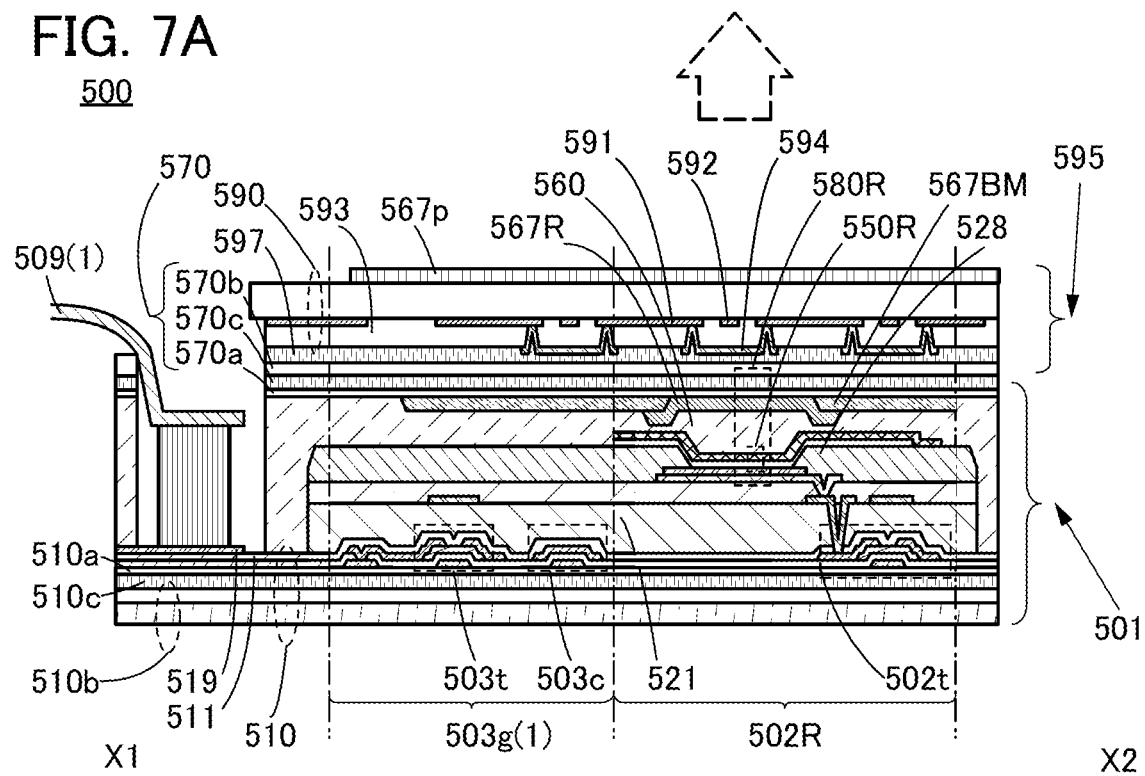
FIGS. 7A-7C show structures of a touch panel that can be used in an information processing device of an embodiment.

FIG. 7(A) is a cross-sectional view of the touch panel 500 along X1-X2 in FIG. 6(A).

The touch panel 500 includes a display portion 501 and a touch sensor 595 (see FIG. 6(B)). Furthermore, the touch panel 500 includes a substrate 510, a substrate 570, and a substrate 590. Note that the substrate 510, the substrate 570, and the substrate 590 each have flexibility.

The display portion 501 includes the substrate 510 and a plurality of pixels, a plurality of wirings 511 through which signals can be supplied to the pixels, and an image signal line driver circuit 503s(1) over the substrate 510. The plurality of wirings 511 are led to a peripheral portion of the substrate 510, and some of them form a terminal 519. The terminal 519 is electrically connected to an FPC 509(1).

<Touch Sensor>

The substrate 590 includes the touch sensor 595 and a plurality of wirings 598 electrically connected to the touch sensor 595. The plurality of wirings 598 are led to a peripheral portion of the substrate 590, and some of them form a terminal. Then, the terminal is electrically connected to an FPC 509(2). Note that in FIG. 6(B), electrodes, wirings, and the like of the touch sensor 595 provided on the back surface side of the substrate 590 (the surface side that faces the substrate 510) are indicated by solid lines for simplicity.

As the touch sensor 595, for example, a capacitive touch sensor can be used. Examples of the capacitive touch sensor include a surface capacitive touch sensor and a projected capacitive touch sensor.

Examples of the projected capacitive touch sensor include a self-capacitive touch sensor and a mutual-capacitive touch sensor, which differ mainly in the driving method. The use of a mutual-capacitive touch sensor is preferred because multiple points can be sensed simultaneously.

The case of using a projected capacitive touch sensor will be described below with reference to FIG. 6(B).

Note that a variety of sensors that can sense the proximity or touch of a sensing target such as a finger can be used.

The projected capacitive touch sensor 595 includes electrodes 591 and electrodes 592. The electrodes 591 are electrically connected to any of the plurality of wirings 598, and the electrodes 592 are electrically connected to any of the other wirings 598.

The electrodes 592 each have a shape of a plurality of quadrangles repetitively arranged in one direction with corners being connected as shown in FIGS. 6(A) and 6(B).

The electrodes 591 each have a quadrangular shape and are repetitively arranged in the direction intersecting with the direction in which the electrodes 592 extend.

A wiring 594 electrically connects two electrodes 591 between which the electrode 592 is sandwiched. Here, the electrodes 591 and the electrode 592 preferably have shapes such that the area of the intersecting portion of the electrode 592 and the wiring 594 is as small as possible. Such a structure allows a reduction in the area of a region where the electrodes are not provided, reducing unevenness in transmittance. As a result, unevenness in luminance of light transmitted through the touch sensor 595 can be reduced.

Note that the shapes of the electrodes 591 and the electrodes 592 are not limited to the above and can be a variety of shapes. For example, a structure may be employed in which the plurality of electrodes 591 are arranged so that a space is formed as little as possible, and the plurality of electrodes 592 are provided with an insulating layer positioned between the electrodes 591 and the electrodes 592 and are spaced apart from each other to form a region not overlapping with the electrodes 591. In that case, a dummy electrode that is electrically insulated from these electrodes is preferably provided between two adjacent electrodes 592, whereby the area of a region having a different transmittance can be reduced.

The structure of the touch sensor 595 will be described with reference to FIG. 7.

The touch sensor 595 includes the substrate 590, the electrodes 591 and the electrodes 592 provided in a staggered arrangement on the substrate 590, an insulating layer 593 covering the electrodes 591 and the electrodes 592, and the wiring 594 that electrically connects the adjacent electrodes 591.

A resin layer 597 bonds the substrate 590 to the substrate 570 such that the touch sensor 595 overlaps with the display portion 501.

The electrodes 591 and the electrodes 592 are formed using a conductive material having a light-transmitting property. As a conductive material having a light-transmitting property, a conductive oxide such as indium oxide, indium tin oxide, indium zinc oxide, zinc oxide, or zinc oxide to which gallium is added can be used. Note that a film containing graphene can also be used. The film containing graphene can be formed, for example, by reducing a film containing graphene oxide that is formed into a film shape. As a reducing method, a method in which heat is applied or the like can be employed.

The electrodes 591 and the electrodes 592 can be formed by depositing a conductive material having a light-transmitting property on the substrate 590 by a sputtering method and then removing an unnecessary portion by any of various patterning techniques such as a photolithography method.

As a material used for the insulating layer 593, a resin such as an acrylic resin or an epoxy resin, a resin having a siloxane bond, such as silicone, and inorganic insulating materials such as silicon oxide, silicon oxynitride, and aluminum oxide can be used, for example.

Openings that reach the electrodes 591 are provided in the insulating layer 593, and the wiring 594 electrically connects the adjacent electrodes 591. A conductive material having a light-transmitting property can be suitably used for the wiring 594 because the aperture ratio of the touch panel can be increased. Furthermore, a material that has higher conductivity than the electrodes 591 and the electrodes 592 can be suitably used for the wiring 594 because electrical resistance can be reduced.

One electrode 592 extends in one direction, and the plurality of electrodes 592 are provided in the form of stripes.

The wiring 594 is provided to intersect with the electrode 592.

A pair of electrodes 591 are provided with one electrode 592 sandwiched therebetween, and the wiring 594 electrically connects the pair of electrodes 591.

Note that the plurality of electrodes 591 are not necessarily arranged in the direction orthogonal to one electrode 592 and may be arranged to form an angle less than 90°.

One wiring 598 is electrically connected to the electrodes 591 or the electrodes 592. Part of the wiring 598 serves as a terminal. For the wiring 598, a metal material such as aluminum, gold, platinum, silver, nickel, titanium, tungsten, chromium, molybdenum, iron, cobalt, copper, or palladium or an alloy material containing any of the metal materials can be used.

Note that an insulating layer that covers the insulating layer 593 and the wiring 594 can be provided to protect the touch sensor 595.

Although not shown in FIG. 7, a connection layer 599 electrically connects the wiring 598 and the FPC 509(2).

As the connection layer 599, various anisotropic conductive films (ACF), anisotropic conductive pastes (ACP), and the like can be used.

The resin layer 597 has a light-transmitting property. For example, a thermosetting resin or an ultraviolet curable resin can be used: specifically, an acrylic resin, polyurethane, an epoxy resin, a resin having a siloxane bond, such as silicone, or the like can be used.

<Display Portion>

The display portion 501 includes a plurality of pixels arranged in a matrix. Each of the pixels includes a display element and a pixel circuit driving the display element.

In this embodiment, the case where an organic electroluminescent element that emits white light is used as a display element is described; however, the display element is not limited thereto.

For example, organic electroluminescent elements with different emission colors may be used in sub-pixels so that the color of emitted light differs between the sub-pixels.

Other than organic electroluminescent elements, various display elements such as display elements (also referred to as electronic ink) that perform display by an electrophoretic method, an electrowetting method, or the like, shutter type MEMS display elements, optical interference type MEMS display elements, and liquid crystal elements can be used as the display element. Furthermore, application to a transmissive liquid crystal display, a transflective liquid crystal display, a reflective liquid crystal display, a direct-view liquid crystal display, or the like is possible. Note that in the case where a transflective liquid crystal display or a reflective liquid crystal display is provided, some or all of pixel electrodes function as reflective electrodes. For example, some or all of pixel electrodes contain aluminum, silver, or the like. Moreover, in such a case, a memory circuit such as SRAM can be provided below the reflective electrodes. Thus, the power consumption can be further reduced. A structure suitable for employed display elements, which is selected from a variety of pixel circuits, can be used.

In the display portion, an active matrix method in which an active element is included in a pixel or a passive matrix method in which an active element is not included in a pixel can be used.

In an active matrix method, as an active element (a non-linear element), not only a transistor but also various active elements (non-linear elements) can be used. For example, an MIM (Metal Insulator Metal), a TFD (Thin Film Diode), or the like can also be used. These elements have a small number of manufacturing steps, resulting in reduced manufacturing costs or improved yield. Alternatively, the aperture ratio can be increased because these elements have small element sizes, which reduces power consumption or achieves higher luminance.

As a method other than the active matrix method, the passive matrix method in which an active element (a non-linear element) is not used can also be used. Since an active element (a non-linear element) is not used, the number of manufacturing steps is small, resulting in reduced manufacturing costs or improved yield. Alternatively, the aperture ratio can be increased because an active element (a non-linear element) is not used, which reduces power consumption or achieves higher luminance, for example.

Flexible materials can be suitably used for the substrate 510 and the substrate 570.

Materials with which passage of impurities is inhibited can be suitably used for the substrate 510 and the substrate 570. For example, materials with a vapor permeability lower than or equal to $10^{-5}$ g/(m$^2$·day), preferably lower than or equal to $10^{-6}$ g/(m$^2$·day) can be suitably used.

Materials having substantially the same coefficients of linear expansion can be suitably used for the substrate 510 and the substrate 570. For example, materials with a coefficient of linear expansion lower than or equal to $1\times10^{-3}$/K, preferably lower than or equal to $5\times10^{-5}$/K, and further preferably lower than or equal to $1\times10^{-5}$/K can be suitably used.

The substrate 510 is a stacked body in which a flexible substrate 510b, a barrier film 510a that prevents diffusion of impurities into light-emitting elements, and a resin layer 510c that bonds the substrate 510b and the barrier film 510a together are stacked.

For example, polyester, polyolefin, polyamide (nylon, aramid, or the like), polyimide, polycarbonate, an acrylic resin, polyurethane, an epoxy resin, or a resin having a siloxane bond, such as silicone, can be used for the resin layer 510c.

The substrate 570 is a stacked body including a flexible substrate 570b, a barrier film 570a that prevents diffusion of impurities into light-emitting elements, and a resin layer 570c that bonds the substrate 570b and the barrier film 570a together.

A sealant 560 bonds the substrate 570 and the substrate 510 together. The sealant 560 has a higher refractive index than the air. In the case of extracting light to the sealant 560 side, the sealant 560 also serves as a layer having an optical adhesive function. The pixel circuits and the light-emitting elements (e.g., a first light-emitting element 550R) are positioned between the substrate 510 and the substrate 570.

<Structure of Pixel>

A pixel includes a sub-pixel 502R, and the sub-pixel 502R includes a light-emitting module 580R.

The sub-pixel 502R includes the first light-emitting element 550R and the pixel circuit including a transistor 502t that can supply electric power to the first light-emitting element 550R. The light-emitting module 580R includes the first light-emitting element 550R and an optical element (e.g., a first coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R in the light extraction direction. The coloring layer transmits light with a particular wavelength, and a layer that selectively transmits light of red, green, blue, or the like can be used, for example. Note that a region that transmits light emitted from the light-emitting element as it is may be provided in another sub-pixel.

In the case where the sealant 560 is provided on the light extraction side, the sealant 560 is in contact with the first light-emitting element 550R and the first coloring layer 567R.

The first coloring layer 567R is in a position overlapping with the first light-emitting element 550R. Accordingly, part of light emitted from the first light-emitting element 550R passes through the first coloring layer 567R and is emitted to the outside of the light-emitting module 580R as indicated by an arrow in the drawing. The information processing device of one embodiment of the present invention includes the first film 102 in the direction of the arrow.

<Structure of Display Portion>

The display portion 501 includes a light-blocking layer 567BM in the light extraction direction. The light-blocking layer 567BM is provided to surround the coloring layer (e.g., the first coloring layer 567R).

The display portion 501 includes an anti-reflective layer 567p in a position overlapping with the pixels. As the anti-reflective layer 567p, a circular polarizing plate can be used, for example.

The display portion 501 includes an insulating film 521. The insulating film 521 covers the transistor 502t. Note that the insulating film 521 can be used as a layer for reducing unevenness caused by the pixel circuits. A stacked-layer film including a layer that can inhibit diffusion of impurities can be used as the insulating film 521. This can inhibit a reduction in the reliability of the transistor 502t or the like due to diffusion of impurities.

The display portion 501 includes the light-emitting elements (e.g., the first light-emitting element 550R) over the insulating film 521.

The display portion 501 includes, over the insulating film 521, a partition wall 528 that overlaps with an end portion of the lower electrode. The display portion 501 further includes, over the partition wall 528, a spacer that controls the distance between the substrate 510 and the substrate 570.

<Structure of Scan Line Driver Circuit>

A scan line driver circuit 503g(1) includes a transistor 503t and a capacitor 503c. Note that the driver circuit and the pixel circuits can be formed in the same process and over the same substrate.

<Other Components>

The display portion 501 includes the wirings 511 that can supply signals, and the wirings 511 are provided with the terminal 519. Note that the FPC 509(1) through which signals such as an image signal and a synchronization signal can be supplied is electrically connected to the terminal 519.

Note that a printed wiring board (PWB) may be bonded to the FPC 509(1).

The display portion 501 includes wirings such as scan lines, signal lines, and power supply lines. Various conductive films can be used for the wirings.

Specifically, a metal element selected from aluminum, chromium, copper, tantalum, titanium, molybdenum, tungsten, nickel, yttrium, zirconium, silver, and manganese; an alloy containing the above-described metal elements as its component: an alloy containing the above-described metal elements in combination: or the like can be used. In particular, one or more elements selected from aluminum, chromium, copper, tantalum, titanium, molybdenum, and tungsten are preferably contained. In particular, an alloy of copper and manganese is suitable for microfabrication with the use of a wet etching method.

Specifically, a two-layer structure in which a titanium film is stacked over an aluminum film, a two-layer structure in which a titanium film is stacked over a titanium nitride film, a two-layer structure in which a tungsten film is stacked over a titanium nitride film, a two-layer structure in which a tungsten film is stacked over a tantalum nitride film or a tungsten nitride film, a three-layer structure of a titanium film, an aluminum film stacked over the titanium film, and a titanium film further formed thereover, or the like can be used.

Specifically, a stacked-layer structure in which an alloy film or a nitride film that combines one or more selected from titanium, tantalum, tungsten, molybdenum, chromium, neodymium, and scandium is stacked over an aluminum film can be used.

Furthermore, a conductive material that contains indium oxide, tin oxide, or zinc oxide and has a light-transmitting property may be used.

Modification Example 1 of Display Portion

A variety of transistors can be used in the display portion 501.

Figure 7B:
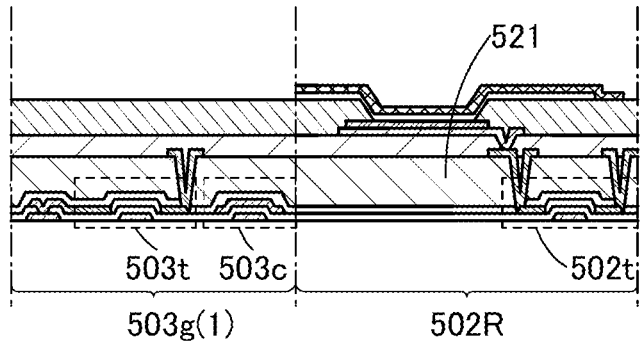

The structure in which bottom-gate transistors are used in the display portion 501 is illustrated in FIG. 7(A) and FIG. 7(B).

For example, a semiconductor layer containing an oxide semiconductor, amorphous silicon, or the like can be used in the transistor 502t and the transistor 503t illustrated in FIG. 7(A).

For example, a film represented by an In-M-Zn oxide that contains at least indium (In), zinc (Zn), and M (a metal such as Al, Ga, Ge, Y, Zr, Sn, La, Ce, or Hf) is preferably included.

Alternatively, both In and Zn are preferably contained.

Examples of a stabilizer include gallium (Ga), tin (Sn), hafnium (Hf), aluminum (Al), and zirconium (Zr). Other examples of the stabilizer include lanthanoids such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

As an oxide semiconductor included in an oxide semiconductor film, for example, an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, an In—Hf—Al—Zn-based oxide, or an In—Ga-based oxide can be used.

Note that here, an In—Ga—Zn-based oxide means an oxide containing In, Ga, and Zn as its main components and there is no limitation on the ratio of In to Ga and Zn. Furthermore, a metal element in addition to In, Ga, and Zn may be contained.

For example, a semiconductor layer containing polycrystalline silicon that is crystallized by treatment such as laser annealing can be used in the transistor 502*t* and the transistor 503*t* illustrated in FIG. 7(B).

Figure 7C:
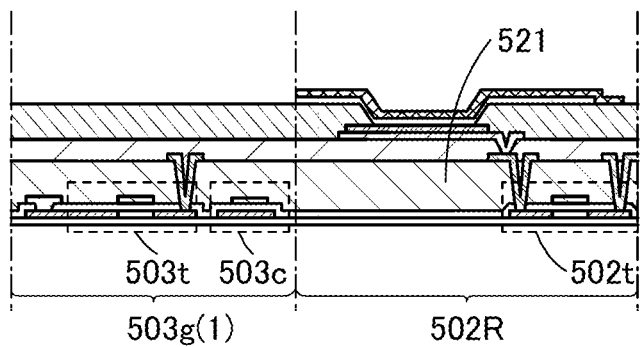

The structure in which top-gate transistors are used in the display portion 501 is illustrated in FIG. 7(C).

For example, a semiconductor layer containing polycrystalline silicon, a single crystal silicon film that is transferred from a single crystal silicon substrate, or the like can be used in the transistor 502*t* and the transistor 503*t* illustrated in FIG. 7(C).

Note that this embodiment can be combined with the other embodiments in this specification as appropriate.

Embodiment 4

In this embodiment, a structure of a foldable touch panel that can be used for the information processing device of one embodiment of the present invention will be described with reference to FIG. 8.

FIG. 8 is a cross-sectional view of a touch panel 500B.

The touch panel 500B described in this embodiment is different from the touch panel 500 described in Embodiment 3 in that the display portion 501 that displays supplied image information on the side where the transistors are provided is included and that the touch sensor is provided on the substrate 510 side of the display portion. Different structures will be described in detail here, and the above description is referred to for portions that can use similar structures.

<Display Portion>

The display portion 501 includes a plurality of pixels arranged in a matrix. Each of the pixels includes a display element and a pixel circuit driving the display element.

<Structure of Pixel>

A pixel includes the sub-pixel 502R, and the sub-pixel 502R includes the light-emitting module 580R.

The sub-pixel 502R includes the first light-emitting element 550R and the pixel circuit including the transistor 502*t* that can supply electric power to the first light-emitting element 550R.

The light-emitting module 580R includes the first light-emitting element 550R and an optical element (e.g., the first coloring layer 567R).

The first light-emitting element 550R includes a lower electrode, an upper electrode, and a layer containing a light-emitting organic compound between the lower electrode and the upper electrode.

The light-emitting module 580R includes the first coloring layer 567R in the light extraction direction. The coloring layer transmits light with a particular wavelength, and a layer that selectively transmits light of red, green, blue, or the like can be used, for example. Note that a region that transmits light emitted from the light-emitting element as it is may be provided in another sub-pixel.

The first coloring layer 567R is in a position overlapping with the first light-emitting element 550R. The first light-emitting element 550R shown in FIG. 8(A) emits light to the side where the transistor 502*t* is provided. Accordingly, part of light emitted from the first light-emitting element 550R passes through the first coloring layer 567R and is emitted to the outside of the light-emitting module 580R as indicated by an arrow in the drawing. The information processing device of one embodiment of the present invention includes the first film 102 in the direction of the arrow.

<Structure of Display Portion>

The display portion 501 includes the light-blocking layer 567BM in the light extraction direction. The light-blocking layer 567BM is provided to surround the coloring layer (e.g., the first coloring layer 567R).

The display portion 501 includes the insulating film 521. The insulating film 521 covers the transistor 502*t*. Note that the insulating film 521 can be used as a layer for reducing unevenness caused by the pixel circuits. A stacked-layer film including a layer that can inhibit diffusion of impurities can be used as the insulating film 521. This can inhibit a reduction in the reliability of the transistor 502*t* or the like due to, for example, impurities diffused from the first coloring layer 567R.

<Touch Sensor>

Figure 8A:
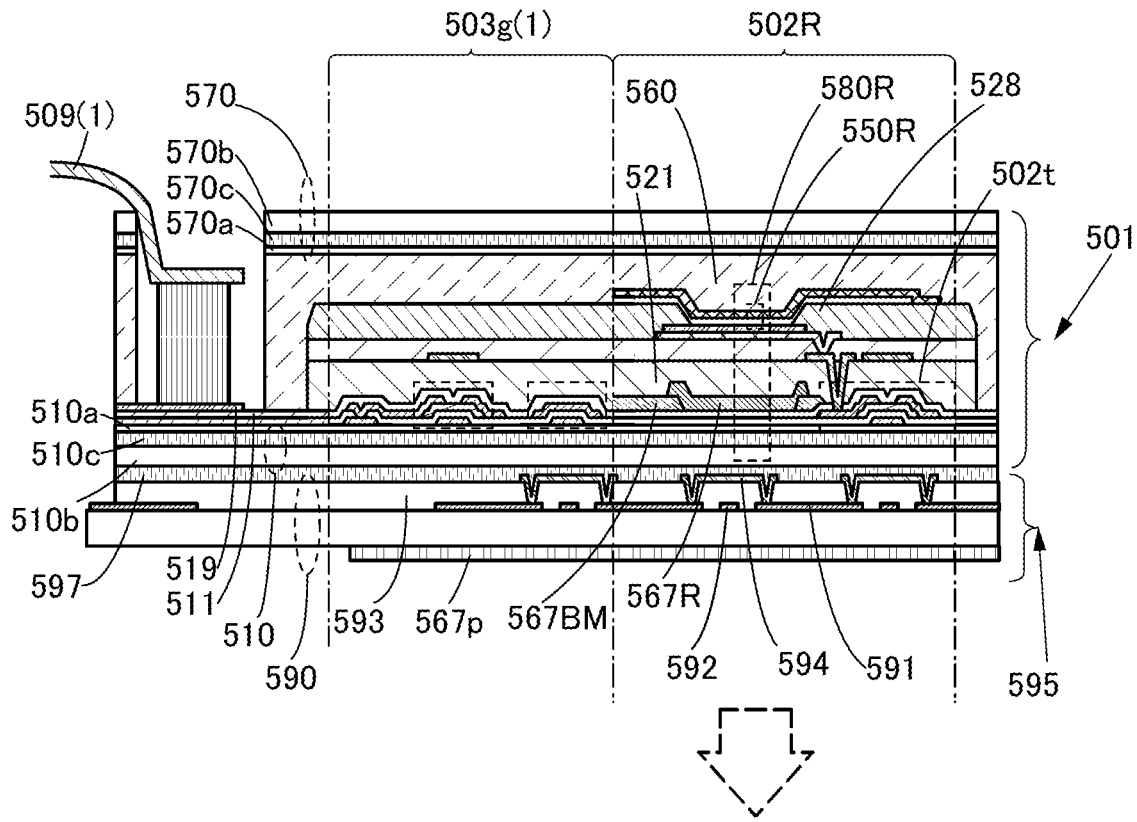
FIGS. 8A-8C show structures of a touch panel that can be used in an information processing device of an embodiment.

The touch sensor 595 is provided on the substrate 510 side of the display portion 501 (see FIG. 8(A)).

The resin layer 597 is positioned between the substrate 510 and the substrate 590 and bonds the display portion 501 and the touch sensor 595 together.

Modification Example 1 of Display Portion

A variety of transistors can be used in the display portion 501.

Figure 8B:
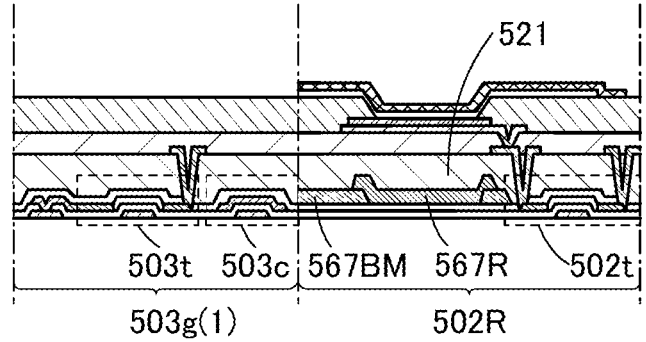

The structure in which bottom-gate transistors are used in the display portion 501 is illustrated in FIG. 8(A) and FIG. 8(B).

For example, a semiconductor layer containing an oxide semiconductor, amorphous silicon, or the like can be used in the transistor 502*t* and the transistor 503*t* illustrated in FIG. 8(A). A pair of gate electrodes may be provided so that a region of a transistor where a channel is formed is sandwiched therebetween. This can reduce variations in characteristics of the transistors and increase the reliability.

For example, a semiconductor layer containing polycrystalline silicon or the like can be used in the transistor 502*t* and the transistor 503*t* illustrated in FIG. 8(B).

Figure 8C:
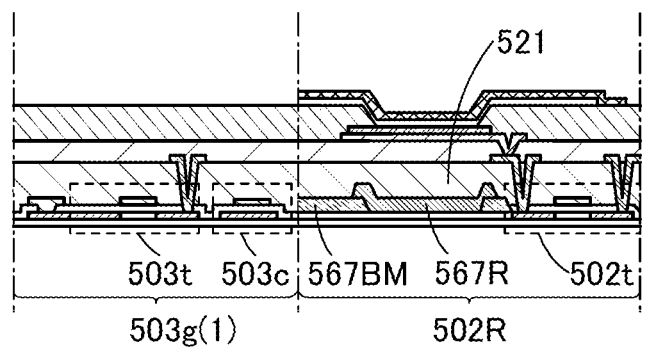

The structure in which top-gate transistors are used in the display portion 501 is illustrated in FIG. 8(C).

For example, a semiconductor layer containing polycrystalline silicon, a transferred single crystal silicon film, or the like can be used in the transistor 502*t* and the transistor 503*t* illustrated in FIG. 8(C).

Note that this embodiment can be combined with the other embodiments in this specification as appropriate.

Embodiment 5

In this embodiment, the rotation direction of the housing described in the other embodiments will be described.

The panel substrate of one embodiment of the present invention is preferably a touch panel. The display portion of the touch panel includes a touch sensor, and a touch position is sensed when the first film 102 is touched with a component with a thin tip, such as a pen or a pencil, a finger, or the like. In other words, the panel substrate 101 is protected by the first film 102.

In order to prevent fracture of the first film 102 due to the touch of a component with a thin tip on the first film 102, the first film 102 needs to have high hardness. The hardness of the first film 102 can be measured by a pencil hardness test. In order to increase the hardness of the first film 102, it is preferable that the first film 102 have sufficient thickness and be formed using a material having sufficient hardness.

The panel substrate 101 includes a plurality of fragile portions 600A such as cracks caused by the touch of a component with a thin tip and an interface between the wirings and the insulating film. Furthermore, the first film 102 includes a plurality of fragile portions 600B caused by the touch of a component with a thin tip, for example.

The panel substrate 101 includes a flexible substrate 601, a flexible substrate 602, and an element formation region 603 positioned therebetween. A wiring formed of a metal layer, an inorganic insulating film, and the like are formed in the element formation region 603, and an interface between them is present. Such an interface, a step, a crystal grain boundary, and the like tend to be the fragile portions 600A. Thus, many fragile portions 600A are present in the element formation region 603. When the fragile portions 600A in the element formation region 603 fracture, an element (e.g., a transistor, a capacitor, or a wiring) included in the element formation region 603 is broken in some cases.

Figure 12A:
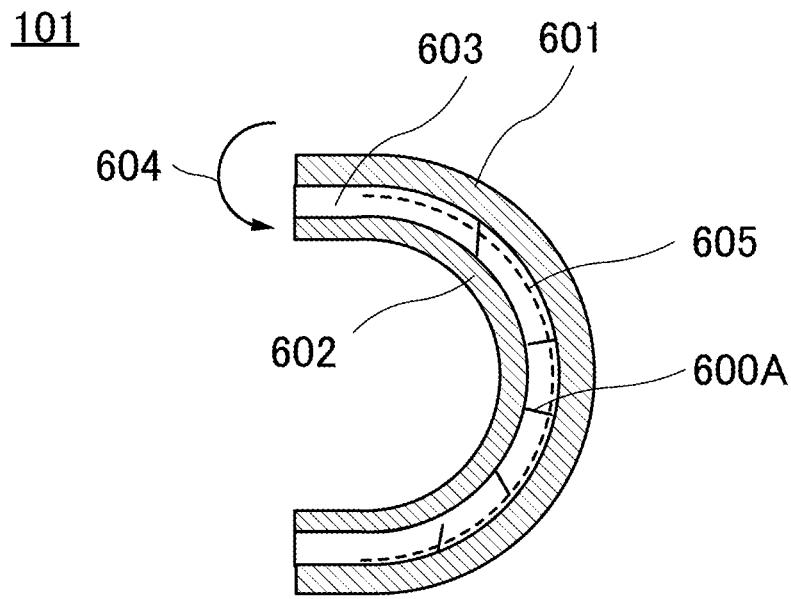
FIGS. 12A and 12B show folding of a touch panel of an embodiment.

For example, the panel substrate 101 is bent within the movable range of the housing and with the substrate 602 inside so that a bending moment 604 is produced in the panel substrate 101 (see FIG. 12 (A)).

When the panel substrate 101 is bent by the bending moment 604, tensile stress is applied, against the bending moment 604, to the substrate 601 on the side where the panel substrate 101 is convexly bent. Furthermore, compressive stress is applied to the substrate 602 on the side where the panel substrate 101 is concavely bent. Note that neither tensile stress nor compressive stress is applied to a surface near the center of the panel substrate 101: this surface is referred to as a neutral surface 605.

The level of stress on the neutral surface 605 of the panel substrate 101 is 0, tensile stress linearly increases toward the surface of the panel substrate 101 on the substrate 601 side, and compressive stress linearly increases toward the surface of the panel substrate 101 on the substrate 602 side. Note that each stress is the maximum at the surface of the panel substrate 101, and the stress on the surface of the panel substrate 101 is referred to as the bending stress of the panel substrate 101.

When tensile stress is applied to the fragile portions 600A, generation of cracks starts from the fragile portions 600A and the fragile portions 600A trigger fracture. By contrast, when compressive stress is applied to the fragile portions 600A, the fragile portions 600A are crushed and thus are less likely to trigger fracture.

Since the element formation region 603 has a thickness, the element formation region 603 cannot be formed only in the neutral surface 605: however, when the element formation region 603 is formed in the vicinity of the neutral surface 605, bending stress applied to the element formation region 603 can be reduced. Furthermore, stress applied to the element formation region 603 is desirably 0 or in the compression direction. In other words, a structure is preferable in which the panel substrate includes the element formation region 603 inward from the neutral surface 605. Thus, cracks are less likely to be generated in the film included in the element formation region 603 even when the panel substrate 101 is inwardly bent.

Figure 12B:
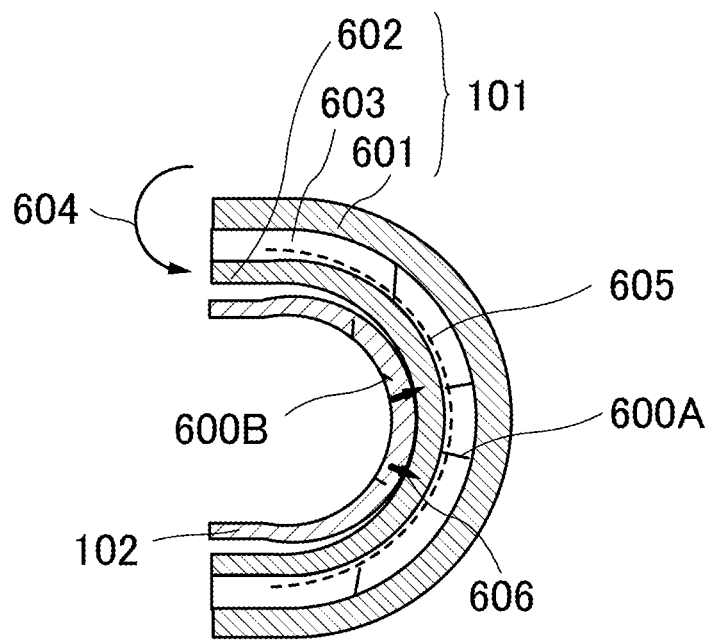

The information processing device of the present invention includes the first film 102 (see FIG. 12(B)). The first film 102 is not fixed to the panel substrate 101. The panel substrate 101 is bent so that the first film 102 is on the concave side. Accordingly, the display portion of the touch panel can be protected. Alternatively, for example, in the case where an external force 606 is applied to the panel substrate 101 from the first film 102 side, the neutral surface 605 of the panel substrate 101 moves toward the first film 102 side: however, a reduction in the external force 606 can relieve tensile stress applied to the element formation region 603. Alternatively, fracture and cracks in the element formation region 603 can be prevented.

Alternatively, the first film 102 has flexibility and includes a hard coat layer on a surface different from the surface that is in contact with the panel substrate 101. Thus, the panel substrate 101 can be protected from a component with a thin tip, such as a pen or a pencil. Alternatively, even when the panel substrate 101 is bent so that the hard coat layer is placed inward, stress applied to the hard coat layer can be always 0 or in the compression direction.

The information processing device of the present invention includes the first housing, the second housing, the panel substrate 101, and the first film 102. The first housing is connected to the second housing so as to be rotatable, the first film 102 includes a surface that is in contact with the panel substrate 101, and the panel substrate 101 includes the element formation region 603 closer to the first film 102 than the neutral surface is, with the surface convexly bent. The first film 102 includes the hard coat layer on the panel substrate 101 side.

In the information processing device of one embodiment of the present invention, the first housing is connected to the second housing so as to be rotatable around the rotation axis within a predetermined movable range, and the predetermined movable range controls the rotation so that the surface of the first film 102 on the panel substrate 101 side is a flat surface or has a convex shape. Accordingly, in the case where the first housing rotates around the rotation axis, generation of tensile stress in the element formation region 603 or the hard coat layer can be prevented. Alternatively, the fracture of the element formation region 603 can be prevented. Alternatively, the fracture of the hard coat layer can be prevented.

A material having flexibility and a visible-light-transmitting property can be used for the first film 102. Examples of the material include polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE) resin. In particular, a material with a low thermal expansion coefficient is preferably used, and for example, a polyamide imide resin, a polyimide resin, or PET with a thermal expansion coefficient of $30\times10^{-6}$/K or less can be suitably used. Furthermore, a substrate in which a glass fiber is impregnated with an organic resin or a substrate whose thermal expansion coefficient is reduced by mixing an organic resin with an inorganic filler can be used. A substrate using such a material is lightweight, and thus a display panel using the substrate can also be lightweight.

As a material of the hard coat layer of the first film 102, a thermosetting resin or the like can be used. For example, an epoxy resin, a phenol resin, an unsaturated polyester resin, a urea resin, a melamine resin, a diallyl phthalate resin, a silicon resin, a vinyl ester resin, polyimide, or polyurethane can be used. These materials are rigid and resistant to heat and a solvent, and thus are effective in terms of surface protection. As the material of the hard coat layer of the first film 102, urethane acrylate is desirably used, for example.

The hard coat layer of the first film 102 preferably contains metal oxide particles such as a silica particle and an alumina particle. The first film 102 is preferably coated with alumina. The first film 102 may have a structure in which a plurality of different materials are stacked. For example, a film having a structure in which a PET film with a thickness of 75 μm is stacked over the hard coat layer with a thickness of 27 μm can be used.

The surface of the first film 102 is preferably processed so that an appropriate friction with a finger or the like touching the surface is generated. For example, appropriate unevenness (texture) may be provided on the first film 102.

In the case of moving a finger touching the first film 102, an excessively large friction between the finger and the first film 102 changes the form of the fingertip. Accordingly, it is difficult to perform input using fine movement of the fingertip. Examples of a material that generates an excessively large friction include glass with a surface that is sufficiently polished to be flat. By contrast, when the friction between the finger and the first film 102 is too small, the finger's sense of touch on the surface is lost.

As a method for generating an appropriate friction on the surface of the first film 102, a film with a surface provided with silica particles or the like can be used as the first film 102. Accordingly, the friction between the finger and the first film 102 can have an appropriate level.

Note that this embodiment can be combined with the other embodiments in this specification as appropriate.

Embodiment 6

In this embodiment, a method for manufacturing a foldable device that can be used in the information processing device of one embodiment of the present invention or electronic devices will be described with reference to FIG. 9 to FIG. 11. Note that examples of the foldable device include a display device, a light-emitting device, and an input device. Examples of the input device include a touch sensor and a touch panel. Examples of the light-emitting device include an organic EL panel and a lighting device. Examples of the display device include an organic EL panel and a liquid crystal display device. Note that a function of the input device such as a touch sensor may be provided in a display device or a light-emitting device. For example, a counter substrate (e.g., a substrate not provided with a transistor) included in a display device or a light-emitting device may be provided with a touch sensor. Alternatively, an element substrate (e.g., a substrate provided with a transistor) included in a display device or a light-emitting device may be provided with a touch sensor. Alternatively, a counter substrate included in a display device or a light-emitting device and an element substrate included in a display device or a light-emitting device may be provided with touch sensors.

Figure 9A:
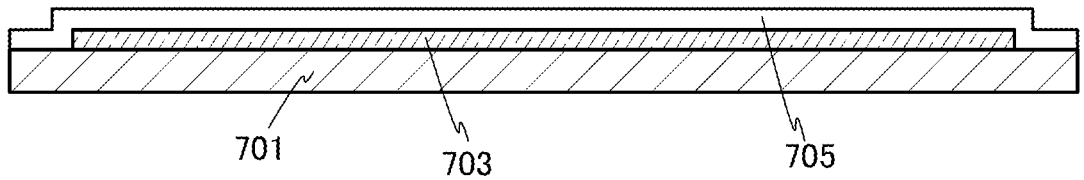
FIGS. 9A-9D show a method for manufacturing a foldable device of an embodiment.
Figure 9B:
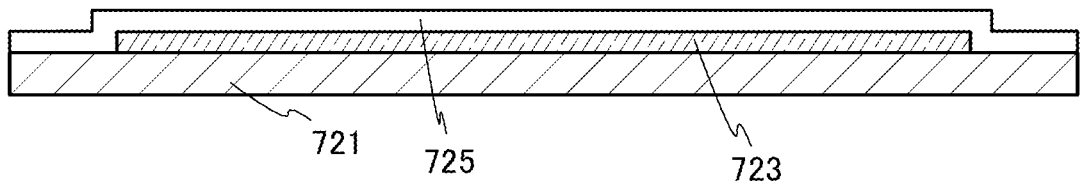

First, a separation layer 703 is formed over a formation substrate 701, and a layer to be separated 705 is formed over the separation layer 703 (FIG. 9(A)). Furthermore, a separation layer 723 is formed over a formation substrate 721, and a layer to be separated 725 is formed over the separation layer 723 (FIG. 9(B)).

For example, when a tungsten film is used as the separation layer, a tungsten oxide film can be formed between the tungsten film and the layer to be separated by an oxidation method performed on the tungsten film, such as plasma treatment with a gas containing oxygen such as $N_2O$, annealing in a gas atmosphere containing oxygen, or forming a tungsten oxide film by a method such as sputtering in a gas atmosphere containing oxygen.

At the time of a separating and transferring process of the tungsten oxide film, it is preferable that tungsten oxide mainly have a composition in which the ratio of oxygen to tungsten is lower than 3. In a homologous series of tungsten oxides such as $W_nO_{(3n-1)}$ and $W_nO_{(3n-2)}$ where n is a natural number greater than or equal to 1, shear is easily caused by overheating of a crystal optical shear plane therein. When the tungsten oxide film is formed by $N_2O$ plasma treatment, the layer to be separated can be separated from the substrate with a weak force.

Alternatively, the tungsten oxide film can be directly formed without forming a tungsten film. For example, only the tungsten oxide film may be formed as the separation layer by performing plasma treatment on a sufficiently thin tungsten film with a gas containing oxygen, annealing a sufficiently thin tungsten film in a gas atmosphere containing oxygen, or forming the tungsten oxide film by a method such as sputtering in a gas atmosphere containing oxygen.

When the separation is caused at the interface between the tungsten film and the tungsten oxide film or inside the tungsten oxide film, the tungsten oxide film remains on the side of the layer to be separated, in some cases. Then, the remaining tungsten oxide film might adversely affect the properties of a transistor. Thus, a step of removing the tungsten oxide film is preferably performed after the step of separating the separation layer and the layer to be separated. Note that with the above method for separation from the substrate, $N_2O$ plasma treatment is not necessarily performed, which can eliminate the step of removing the tungsten oxide film. In that case, the device can be manufactured more easily.

In one embodiment of the present invention, a tungsten film with a thickness greater than or equal to 0.1 nm and less than 200 nm is used over the substrate.

Other than a tungsten film, a film containing molybdenum, titanium, vanadium, tantalum, silicon, aluminum, or an alloy thereof may be used as the separation layer. Furthermore, a stacked-layer structure of such a film and its oxide film may be used. The separation layer is not limited to an inorganic film, and an organic film such as polyimide may be used.

In the case where an organic resin is used for the separation layer, a process needs to be performed at lower than or equal to 350° C. to use low-temperature polysilicon in a semiconductor layer. Thus, dehydrogenation baking for silicon crystallization, hydrogenation for termination of defects in silicon, activation of a doped region, or the like cannot be performed sufficiently, which limits the performance. On the other hand, in the case where an inorganic film is used, the deposition temperature is not limited to 350° C., and excellent characteristics can be obtained.

In the case where an organic resin is used for the separation layer, the organic resin or a functional element is damaged in some cases by laser irradiation for crystallization, whereas in the case where an inorganic film is used for the separation layer, such a problem is not caused, which is preferable.

Furthermore, in the case where an organic resin is used for the separation layer, the organic resin is shrunk by laser irradiation for separating the resin and contact failure is caused in the contact portion of the terminal of an FPC or the like, which makes it difficult for functional elements with many terminals in a high-definition display or the like to be separated and transferred with high yield. There is no such limitation in the case where an inorganic film is used for the separation layer, and functional elements with many terminals in a high-definition display or the like can be separated and transferred with high yield.

In the method for separating a functional element from a substrate of one embodiment of the present invention, an insulating layer and a transistor can be formed over a formation substrate at lower than or equal to 600° C. This allows the use of high-temperature polysilicon for a semiconductor layer. In that case, with use of a conventional line for high-temperature polysilicon, a semiconductor device with a high operation speed, a high gas barrier property, and high reliability can be mass-produced. In that case, with use of the insulating layer and the transistor formed through a process at 600° C. or lower, insulating layers with a high gas barrier property formed under the deposition condition of lower than or equal to 600° C. can be placed above and below an organic EL element. Accordingly, entry of impurities such as moisture into the organic EL element or the semiconductor layer is inhibited, whereby an extraordinarily reliable light-emitting device can be obtained as compared with the case of using an organic resin or the like for the separation layer.

Alternatively, the insulating layer and the transistor can be formed over the formation substrate at 500° ° C. or lower. In that case, low-temperature polysilicon or an oxide semiconductor can be used for the semiconductor layer, and mass production is possible with use of a conventional production line for low-temperature polysilicon. Also in that case, with use of the insulating layer and the transistor formed through the process at 500° C. or lower, insulating layers with a high gas barrier property formed under the deposition condition of 500° C. or lower can be placed above and below the organic EL element. Accordingly, the entry of impurities such as moisture into the organic EL element or the semiconductor layer is inhibited, whereby a highly reliable light-emitting device can be obtained as compared with the case of using an organic resin or the like for the separation layer.

Alternatively, the insulating layer and the transistor can be formed over the formation substrate at 400° C. or lower. In that case, amorphous silicon or an oxide grain semiconductor can be used for the semiconductor layer, and mass production is possible with use of a conventional production line for amorphous silicon. Also in that case, with use of the insulating layer and the transistor formed through the process at 400° C. or lower, insulating layers with a high gas barrier property formed under the deposition condition of 400° C. or lower can be placed above and below the organic EL element. Accordingly, the entry of impurities such as moisture into the organic EL element or the semiconductor layer is inhibited, whereby a highly reliable light-emitting device can be obtained as compared with the case of using an organic resin or the like for the separation layer.

Figure 9C:
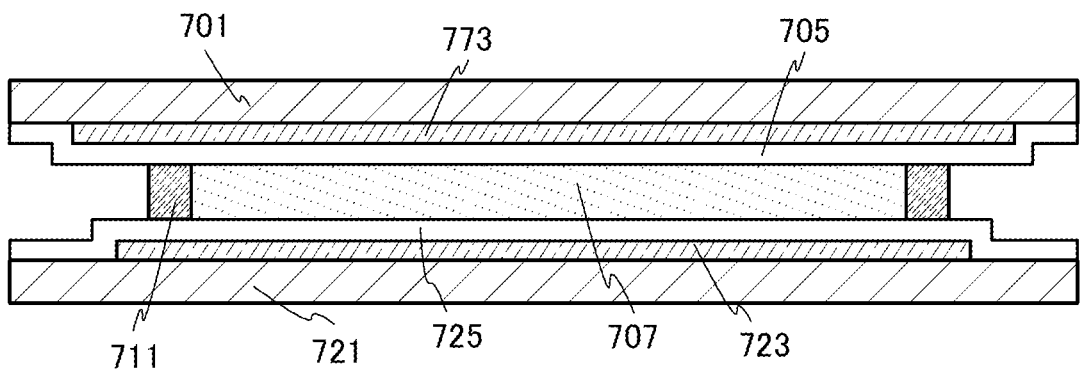

Next, the formation substrate 701 and the formation substrate 721 are bonded together by using a bonding layer 707 and a frame-like bonding layer 711 so that the surfaces over which the layers to be separated are formed face each other, and then, the bonding layer 707 and the frame-like bonding layer 711 are cured (FIG. 9(C)). Here, the frame-like bonding layer 711 and the bonding layer 707 positioned inward from the frame-like bonding layer 711 are provided over the layer to be separated 725 and after that, the formation substrate 701 and the formation substrate 721 face each other and are bonded together.

Note that the formation substrate 701 and the formation substrate 721 are preferably bonded together in a reduced-pressure atmosphere.

Figure 9D:
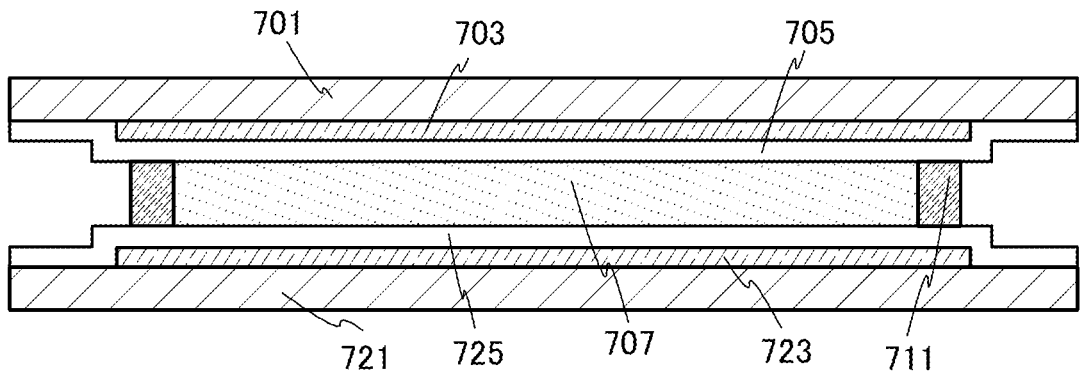

Note that although FIG. 9(C) shows the case where the separation layer 703 and the separation layer 723 are different in size, separation layers having the same size as shown in FIG. 9(D) may be used.

The bonding layer 707 is placed to overlap with the separation layer 703, the layer to be separated 705, the layer to be separated 725, and the separation layer 723. Then, end portions of the bonding layer 707 are preferably positioned inward from end portions of at least one of the separation layer 703 and the separation layer 723 (one that is desirably separated from the substrate first). In that case, strong adhesion between the formation substrate 701 and the formation substrate 721 can be inhibited: thus, a decrease in the yield of a subsequent separating process can be inhibited.

Figure 10A:
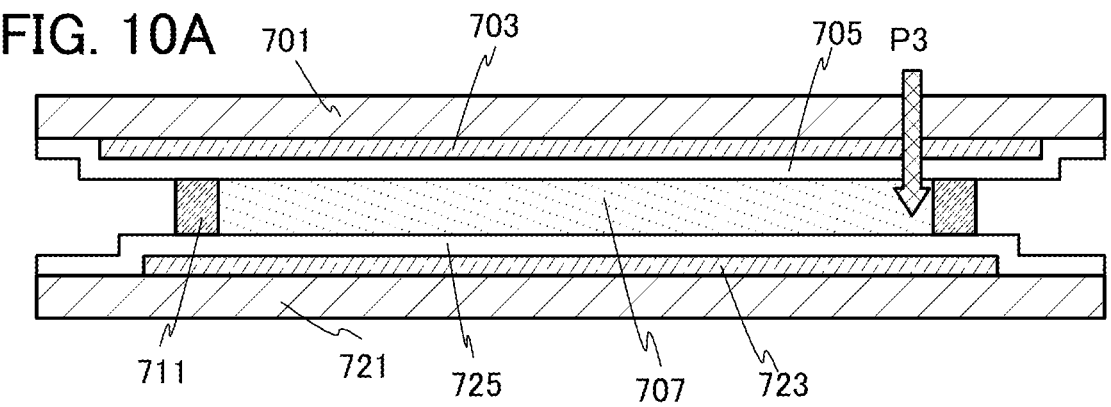
FIGS. 10A-10D show a method for manufacturing a foldable device of an embodiment.
Figure 10B:
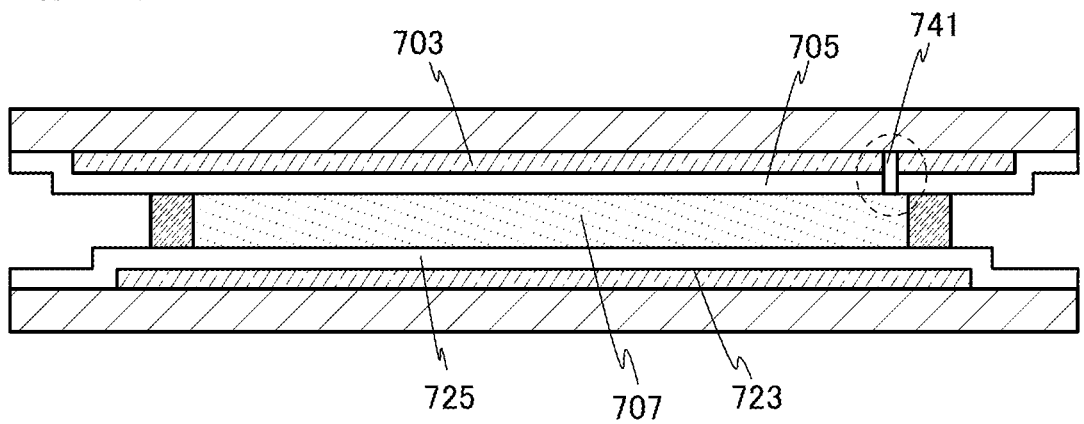

Next, a first trigger 741 for separation from the substrate is formed by laser light irradiation (FIGS. 10(A) and 10(B)).

Either the formation substrate 701 or the formation substrate 721 may be separated first. In the case where the separation layers differ in size, a substrate over which a larger separation layer is formed may be separated first or a substrate over which a smaller separation layer is formed may be separated first. In the case where an element such as a semiconductor element, a light-emitting element, or a display element is formed over only one of the substrates, the substrate on which the element is formed may be separated first or the other substrate may be separated first. Here, an example in which the formation substrate 701 is separated first is described.

A region where the bonding layer 707 in a cured state or the frame-like bonding layer 711 in a cured state, the layer to be separated 705, and the separation layer 703 overlap with one another is irradiated with laser light. Here, the case where the bonding layer 707 is in a cured state and the frame-like bonding layer 711 is not in a cured state is exemplified, and the bonding layer 707 in a cured state is irradiated with laser light (see an arrow P3 in FIG. 10(A)).

Part of the layer to be separated 705 is removed, whereby the first trigger 741 for separation from the substrate can be formed (see a region surrounded by a dotted line in FIG. 10(B)). At this time, not only the layer to be separated 705 but also the separation layer 703, the bonding layer 707, or another layer in the layer to be separated 705 may be partly removed.

It is preferred that laser light irradiation be performed from the side of the substrate provided with the separation layer that is desirably separated. In the case where a region where the separation layer 703 and the separation layer 723 overlap with each other is irradiated with laser light, the formation substrate 701 and the separation layer 703 can be selectively separated by cracking only the layer to be separated 705 of the layer to be separated 705 and the layer to be separated 725 (see the region surrounded by the dotted line in FIG. 10(B)).

In the case where the region where the separation layer 703 and the separation layer 723 overlap with each other is irradiated with laser light, it might be difficult to selectively separate one of the formation substrates when a trigger for separation from the substrate is formed in each of the layer to be separated 705 on the separation layer 703 side and the layer to be separated 725 on the separation layer 723 side. Therefore, laser light irradiation conditions are sometimes restricted so that only one of the layers to be separated is cracked. The method for forming the first trigger 741 for separation from the substrate is not limited to laser light irradiation, and the first trigger 741 may be formed with a sharp knife such as a cutter.

Figure 10C:
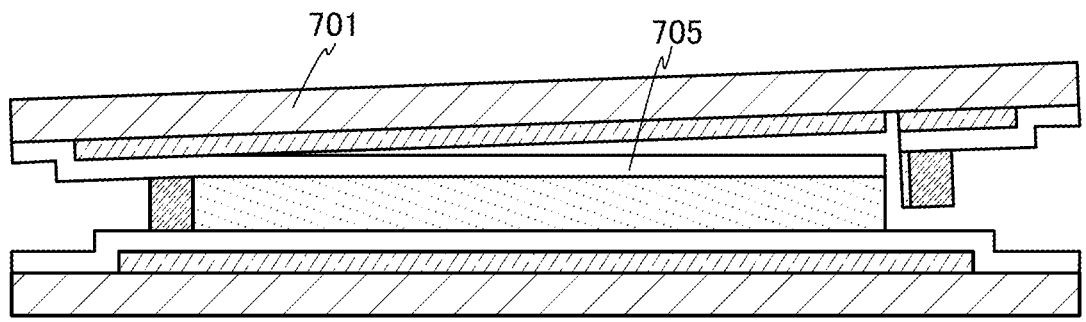
Figure 10D:
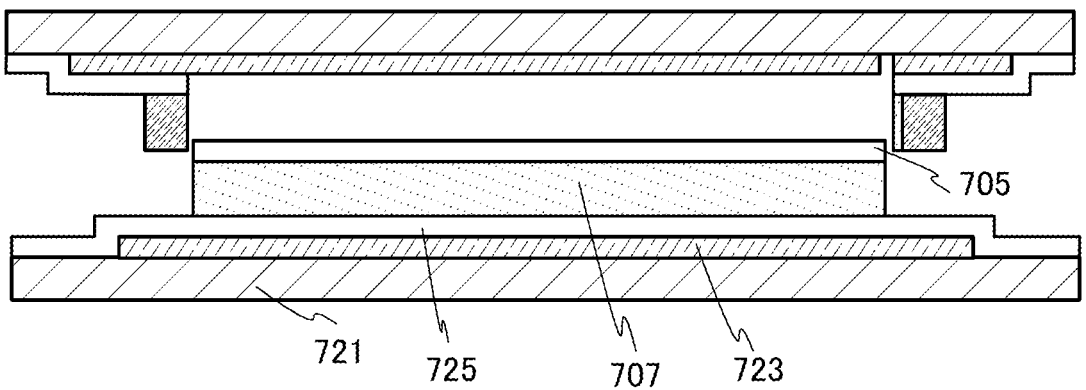

Then, the layer to be separated 705 and the formation substrate 701 are separated from each other from the formed first trigger 741 for separation from the substrate (FIGS. 10(C) and 10(D)). Consequently, the layer to be separated 705 can be transferred from the formation substrate 701 to the formation substrate 721.

Figure 11A:
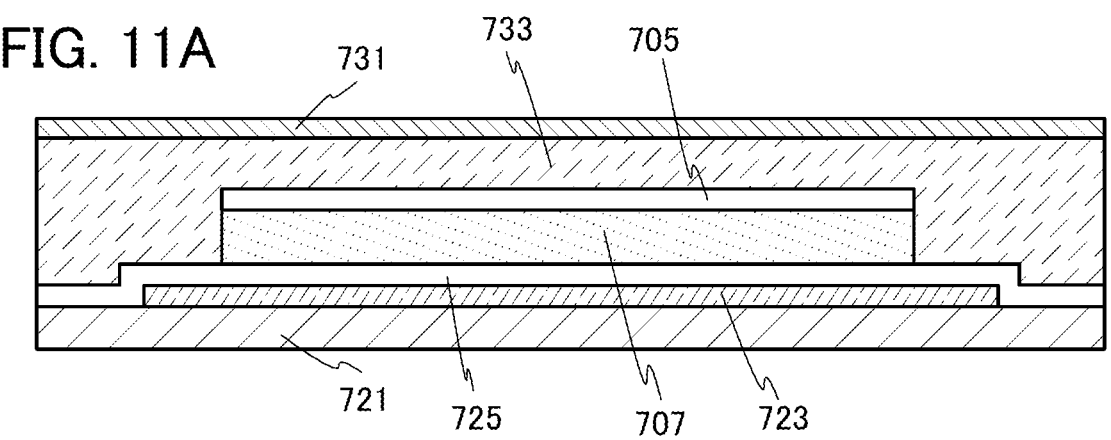
FIGS. 11A-11D show a method for manufacturing a foldable device of an embodiment.

The layer to be separated 705 that is separated from the formation substrate 701 in the step shown in FIG. 10(D) is bonded to a substrate 731 with the use of a bonding layer 733, and the bonding layer 733 is cured (FIG. 11(A)).

Figure 11B:
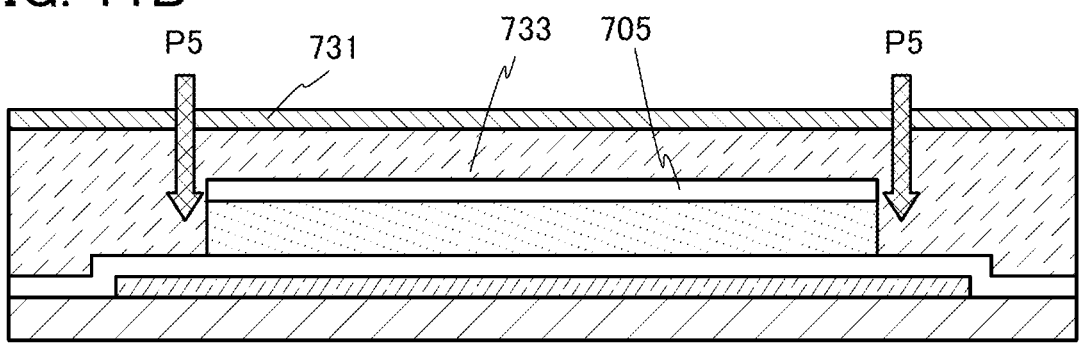
Figure 11C:
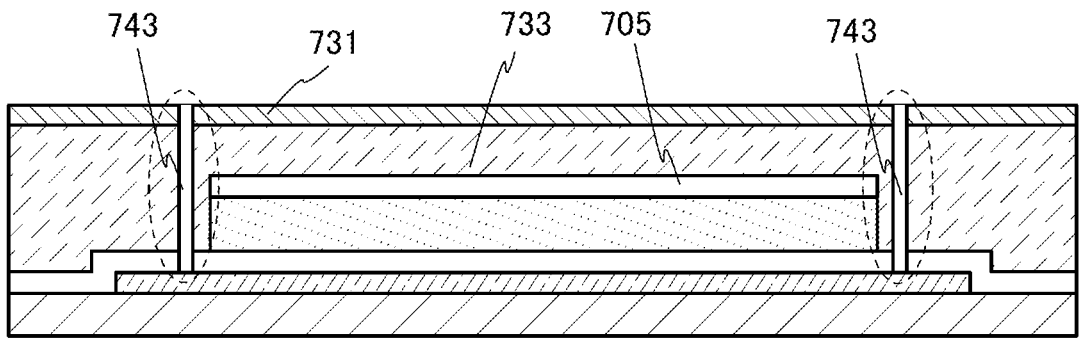

Next, a second trigger 743 for separation from the substrate is formed with a sharp knife such as a cutter (FIGS. 11(B) and 11(C)). A method for forming the second trigger 743 for separation from the substrate is not limited to a sharp knife such as a cutter, and the second trigger 743 may be formed by laser light irradiation or the like.

In the case where the substrate 731 on the side where the separation layer 723 is not provided can be cut with a knife or the like, a cut may be made in the substrate 731, the bonding layer 733, and the layer to be separated 725 (see arrows P5 in FIG. 11(B)). Consequently, part of the layer to be separated 725 can be removed: thus, the second trigger 743 for separation from the substrate can be formed (see a region surrounded by a dotted line in FIG. 11(C)).

In the case where the formation substrate 721 and the substrate 731 are bonded together with the use of the bonding layer 733 in a region not overlapping with the separation layer 723 as shown in FIGS. 11(B) and 11(C), the yield of a subsequent process of separation from the substrate might be decreased depending on the degree of adhesion between the formation substrate 721 side and the substrate 731 side. Therefore, a cut is preferably made in a frame shape in a region where the bonding layer 733 in a cured state and the separation layer 723 overlap with each other to form the second trigger 743 for separation from the substrate in the form of a solid line. This can increase the yield of the process of separation from the substrate.

Figure 11D:
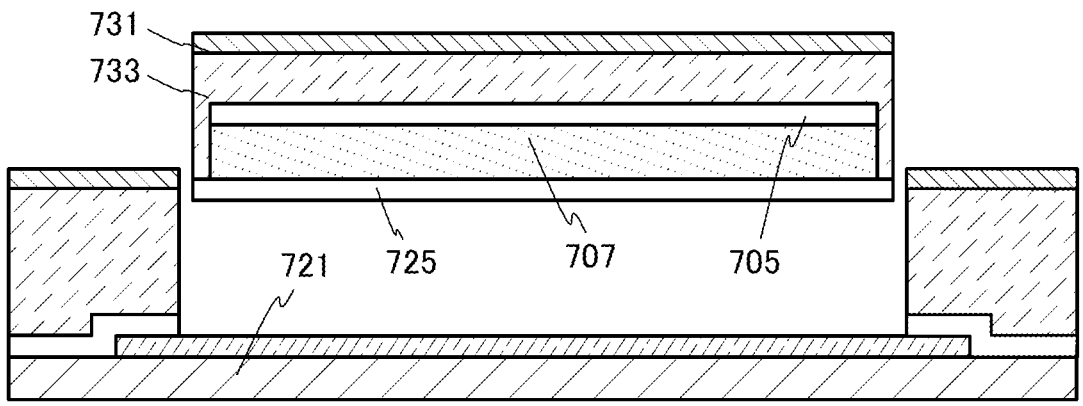

Then, the layer to be separated 725 and the formation substrate 721 are separated from each other from the formed second trigger 743 for separation from the substrate (FIG. 11(D)). Accordingly, the layer to be separated 725 can be transferred from the formation substrate 721 to the substrate 731.

For example, in the case where a tungsten oxide film that is tightly anchored by $N_2O$ plasma or the like is formed on an inorganic film such as a tungsten film, adhesion can be relatively high in deposition. After that, when a separation trigger is formed, cleavage occurs therefrom, whereby a layer to be separated can be easily separated from a formation substrate and transferred to a substrate.

The formation substrate 721 and the layer to be separated 725 may be separated from each other by filling the interface between the separation layer 723 and the layer to be separated 725 with a liquid such as water. A portion between the separation layer 723 and the layer to be separated 725 absorbs a liquid through a capillary action: accordingly, an adverse effect on a functional element such as an FET included in the layer to be separated 725 due to static electricity caused at the time of separation from the substrate (e.g., damage to a semiconductor element from static electricity) can be inhibited.

In the case where a bond of M-O-W (M is a given element) is divided by application of physical force, a liquid is absorbed into the portion, whereby the bond becomes bonds of M-OH and HO—W with a longer bond distance and the separation can be promoted.

Note that a liquid may be sprayed in the form of mist or vapor. As the liquid, pure water, an organic solvent, or the like can be used, and a neutral, alkali, or acid aqueous solution, an aqueous solution in which a salt is dissolved, or the like may be used.

The temperature of the liquid and the substrate at the time of dynamic separation is set in the range from room temperature to 120° C., and preferably set from 60° C. to 90° C.

In the method for separation from a substrate of one embodiment of the present invention described above, separation of the formation substrate is performed after the second trigger 743 for separation from the substrate is formed with a sharp knife or the like so that the separation layer and the layer to be separated are made in an easily separable state. This can improve the yield of the process of separation from the substrate.

Furthermore, a pair of formation substrates each provided with a layer to be separated are bonded together in advance and then the formation substrates are individually separated, so that bonding of a substrate with which a device is to be manufactured can be performed. Therefore, formation substrates having low flexibility can be bonded together when the layers to be separated are bonded together, whereby alignment accuracy at the time of bonding can be improved as compared with the case where flexible substrates are bonded together.

In the method for separation from a substrate of one embodiment of the present invention, a first layer and a second layer from which hydrogen is released by heating are provided in a layer to be separated that is provided over an oxide layer. Moreover, $WO_3$ in the oxide layer can be reduced by hydrogen released by heat treatment from the layer to be separated, so that the oxide layer containing a large amount of $WO_2$ can be formed. Consequently, separability from the substrate can be improved.

This embodiment can be implemented in combination with the other embodiments and example described in this specification as appropriate.

Embodiment 7

In this embodiment, a structure of an electronic device of one embodiment of the present invention will be described with reference to FIG. 13.

<Electronic Device>

Figure 13:
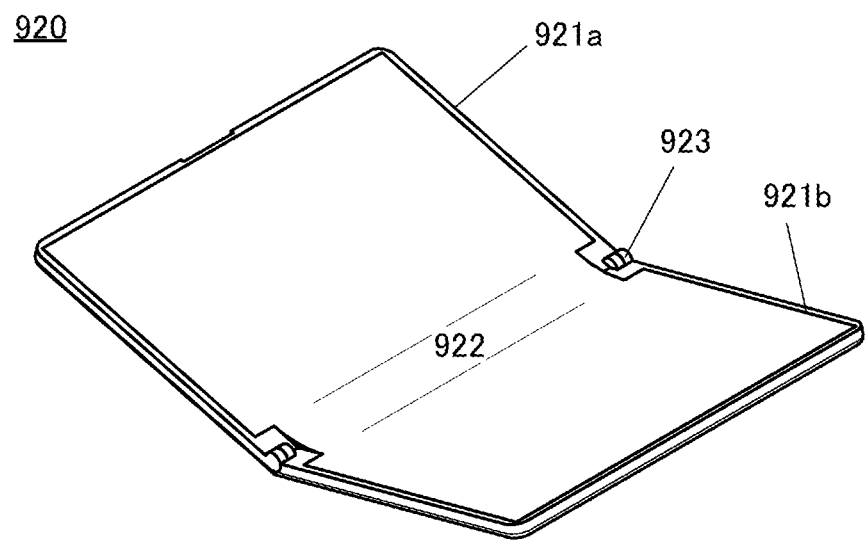
FIG. 13 shows an electronic device including an input/output device of an embodiment.

FIG. 13 shows a foldable electronic device 920. The electronic device 920 shown in FIG. 13 includes a housing 921a, a housing 921b, a display portion 922, a hinge 923, and the like. The display portion 922 is incorporated in the housing 921a and the housing 921b.

The housing 921a and the housing 921b are rotatably joined together by the hinge 923. The electronic device 920 can be changed in its form between a state where the housing 921a and the housing 921b are closed and a state where they are opened, as shown in FIG. 13. Thus, the electronic device has high portability when carried and excellent visibility when used because of its large display region.

The hinge 923 preferably includes a locking mechanism so that an angle formed between the housing 921a and the housing 921b does not become an angle larger than a predetermined angle when they are opened. For example, an angle at which they become locked (they are not opened any further) is preferably greater than or equal to 90° and less than 180° and can be typically 90°, 120°, 135°, 150°, 175°, or the like. Accordingly, the convenience, the safety, and the reliability can be improved.

In the electronic device 920, the flexible display portion 922 is provided across the housing 921a and the housing 921b which are joined together by the hinge 923.

In the electronic device 920, the display portion 922 is held in a state of being greatly curved with the housing 921a and the housing 921b open. For example, the display portion 922 is held with a curvature radius greater than or equal to 1 mm and less than or equal to 50 mm, and preferably greater than or equal to 5 mm and less than or equal to 30 mm. Part of the display portion 922 can perform display in a curved surface shape since pixels are continuously arranged from the housing 921a to the housing 921b.

Since the hinge 923 includes the above-described locking mechanism, excessive force is not applied to the display portion 922; thus, breakage of the display portion 922 can be prevented. Consequently, a highly reliable electronic device can be obtained.

The display portion 922 functions as a touch panel and can be operated with a finger, a stylus, or the like.

One of the housing 921a and the housing 921b is provided with a wireless communication module, and data can be transmitted and received through a computer network such as the Internet, a LAN (Local Area Network), or Wi-Fi (Wireless Fidelity: registered trademark). One of the housing 921a and the housing 921b may be provided with a keyboard, a hardware button, a pointing device, an illuminance sensor, an imaging device, an audio input device, an eye-gaze input device, or a pose detection device.

The electronic device of one embodiment of the present invention can have various applications when the size of the display portion 922 is changed as appropriate. Examples of the electronic device include a portable information terminal that is easy to carry.

For example, text information can be displayed on the display portion 922; thus, the electronic device can be used as an e-book reader. For example, the display portion 922 can be used as a textbook, which has a structure in which A4 size is folded in two. The display portion 922 can also display a still image or a moving image.

At least part of this embodiment can be implemented in combination with the other embodiments described in this specification as appropriate.

REFERENCE NUMERALS

101: panel substrate
102: film
103: film
104-1: housing
104-1A: first part
104-1B: second part
104-2: housing
104-2A: first part
104-2B: second part
105-1: hinge
106: circuit board
107: FPC
108-1: slit
108-2: slit
109: socket
110: end portion
111: end portion
116: support portion
117: support portion
300: touch panel
301: display portion
302: pixel
302B: sub-pixel
302G: sub-pixel
302R: sub-pixel
302t: transistor
303c: capacitor
303g(1): scan line driver circuit
303g(2): imaging pixel driver circuit
303s(1): image signal line driver circuit
303s(2): imaging signal line driver circuit
303t: transistor
308: imaging pixel
308p: photoelectric conversion element
308t: transistor
309: FPC
310: substrate
310a: barrier film
310b: substrate
310c: resin layer
311: wiring
319: terminal
321: insulating film
328: partition
329: spacer
350R: light-emitting element
351R: lower electrode
352: upper electrode
353: layer
353a: light-emitting unit
353b: light-emitting unit
354: intermediate layer
360: sealant
367BM: light-blocking layer
367p: anti-reflective layer
367R: coloring layer
370: counter substrate
370a: barrier film
370b: base
370c: resin layer
380B: light-emitting module
380G: light-emitting module
380R: light-emitting module
400: touch panel
401(1): region
401(2): region
406: line segment
407: line segment
500: touch panel
500B: touch panel
501: display portion
502R: sub-pixel
502t: transistor
503c: capacitor
503g: scan line driver circuit
503t: transistor
509: FPC
510: substrate
510a: barrier film
510b: substrate 510c: resin layer
511: wiring
519: terminal
521: insulating film
528: partition
550R: light-emitting element
560: sealant
567BM: light-blocking layer
567p: anti-reflective layer
567R: coloring layer
570: substrate
570a: barrier film
570b: substrate
570c: resin layer
580R: light-emitting module
590: substrate
591: electrode
592: electrode
593: insulating layer
594: wiring
595: touch sensor
597: resin layer
598: wiring
599: connection layer
600A: fragile portion
600B: fragile portion
601: substrate
602: substrate
603: element formation region
604: bending moment
605: neutral surface
701: formation substrate
703: separation layer
705: layer to be separated
707: bonding layer
711: frame-like bonding layer
721: formation substrate
723: separation layer
725: layer to be separated
731: substrate
733: bonding layer
741: first trigger for separation
743: second trigger for separation
920: electronic device
921a: housing
921b: housing
922: display portion
923: hinge

The invention claimed is:

1. An information processing device comprising:
a first film;
a first housing;
a second housing; and
a touch panel comprising:
   a first flexible substrate;
   a second flexible substrate; and
   an element formation region between the first flexible substrate and the second flexible substrate,
wherein a display portion of the touch panel comprises a touch sensor,
wherein the first film is not fixed to the touch panel,
wherein the first housing is connected to the second housing to be rotatable around a rotation axis within a predetermined movable range,
wherein the predetermined movable range controls the rotation axis so that the first film is on a concave side,
wherein the touch panel in the first housing is curved in an unfolded state, and
wherein the first film is closer to an end portion of the second housing than the touch panel in a folded state where a display surface is concave.

2. The information processing device according to claim 1,
wherein the first film comprises a hard coat layer on a surface different from a surface in contact with the touch panel.

3. The information processing device according to claim 2,
wherein, when the touch panel is bent so that the hard coat layer is placed inward, stress applied to the hard coat layer is always 0 or in a compression direction.

4. The information processing device according to claim 3, wherein a material used for the first film is selected from a polyester resin, a polyacrylonitrile resin, a polyimide resin, a polymethyl methacrylate resin, a polycarbonate resin, a polyethersulfone resin, a polyamide resin, a cycloolefin resin, a polystyrene resin, a polyamide imide resin, a glass fiber impregnated with an organic resin, and an organic resin mixed with an inorganic filler.

5. The information processing device according to claim 4, wherein a material used for the hard coat layer of the first film is selected from an epoxy resin, a phenol resin, an unsaturated polyester resin, a urea resin, a melamine resin, a diallyl phthalate resin, a silicon resin, a vinyl ester resin, polyimide, and polyurethane.

6. The information processing device according to claim 5, wherein the material used for the hard coat layer of the first film is urethane acrylate.

7. The information processing device according to claim 5, wherein the material used for the hard coat layer of the first film contains metal oxide particles.

8. The information processing device according to claim 7,
wherein the first film is coated with alumina, and
wherein a surface of the first film is provided with a texture.

9. The information processing device according to claim 1,
wherein the first housing comprises a first slit,
wherein the second housing comprises a second slit,
wherein a region of the first film is stored in one or both of the first slit and the second slit, and
wherein the first film is configured to slide along the second slit.

* * * * *